US008542706B2

(12) United States Patent
Wang et al.

(10) Patent No.: US 8,542,706 B2
(45) Date of Patent: Sep. 24, 2013

(54) METHOD AND APPARATUS RELATED TO PACKET FRAGMENTATION AND RECONSTRUCTION

(75) Inventors: Hua Wang, Bridgewater, NJ (US); Saurabh Tavildar, Jersey City, NJ (US); Vincent D. Park, Budd Lake, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 28 days.

(21) Appl. No.: 12/329,780

(22) Filed: Dec. 8, 2008

(65) Prior Publication Data
US 2010/0142556 A1 Jun. 10, 2010

(51) Int. Cl.
*H04J 3/24* (2006.01)
(52) U.S. Cl.
USPC .......................................................... 370/474
(58) Field of Classification Search
USPC ...... 370/389–395.1, 464–476; 709/230–231, 709/236, 246–247
See application file for complete search history.

(56) References Cited

U.S. PATENT DOCUMENTS

| 6,377,782 | B1 * | 4/2002 | Bishop et al. ................. 455/3.01 |
|---|---|---|---|
| 6,665,313 | B1 * | 12/2003 | Chang et al. .................... 370/469 |
| 6,778,558 | B2 * | 8/2004 | Balachandran et al. ...... 370/470 |
| 6,819,660 | B2 * | 11/2004 | Khare et al. .................... 370/342 |
| 6,888,848 | B2 * | 5/2005 | Beshai et al. .................. 370/474 |
| 6,970,478 | B1 * | 11/2005 | Nishihara ...................... 370/474 |
| 7,283,528 | B1 * | 10/2007 | Lim et al. ....................... 370/392 |
| 7,505,483 | B2 * | 3/2009 | Jeon et al. ...................... 370/469 |
| 7,764,751 | B1 * | 7/2010 | Hammell et al. ............. 375/343 |
| 7,839,852 | B2 * | 11/2010 | Liu et al. ........................ 370/392 |
| 7,953,115 | B2 * | 5/2011 | Nataga et al. ................. 370/474 |
| 7,978,729 | B2 * | 7/2011 | Moorti et al. ................. 370/468 |
| 8,102,880 | B2 * | 1/2012 | Charpentier et al. ......... 370/474 |
| 2001/0024435 | A1 * | 9/2001 | Birdwell et al. .............. 370/349 |
| 2001/0048681 | A1 * | 12/2001 | Bilic et al. ..................... 370/389 |
| 2002/0016852 | A1 * | 2/2002 | Nishihara ...................... 709/236 |

(Continued)

FOREIGN PATENT DOCUMENTS
WO WO2008097059 A1 8/2008

OTHER PUBLICATIONS

International Search Report and Written Opinion—PCT/US2009/066872, International Search Authority—European Patent Office—Apr. 14, 2010.
Taiwan Search Report—TW098141931—TIPO—Dec. 5, 2012.

*Primary Examiner* — Kwang B Yao
*Assistant Examiner* — Juvena Loo
(74) *Attorney, Agent, or Firm* — James K. O'Hare

(57) ABSTRACT

Methods and apparatus related to packet fragmentation and reconstruction are described. A sequence of bits is generated including at least one header and at least partial packet payload prior to a determination of the actual data rate to be used in a communications segment. In some embodiments, the generated sequence of bits corresponds to a prepared information bit stream for a best case scenario in which the highest data rate is selected for segment. Various embodiments allow for the selection of the data rate to be used for the communications segment to be delayed until just prior to the transmission. Thus the selection of the data rate for the communications segment, and thus the segment capacity, can be based on more current channel condition information than would otherwise be possible if the communications device needed to know the data rate for the segment before performing header and packet fragmentation operations.

25 Claims, 12 Drawing Sheets

(56) References Cited

U.S. PATENT DOCUMENTS

| | | | |
|---|---|---|---|
| 2002/0057713 A1* | 5/2002 | Bagchi et al. | 370/468 |
| 2002/0104058 A1* | 8/2002 | Rappaport | 714/784 |
| 2002/0126685 A1* | 9/2002 | Leatherbury et al. | 370/432 |
| 2002/0146001 A1* | 10/2002 | Fushimi et al. | 370/352 |
| 2003/0174688 A1* | 9/2003 | Ahmed et al. | 370/349 |
| 2004/0042440 A1 | 3/2004 | McGowan | |
| 2005/0068900 A1* | 3/2005 | Stephens et al. | 370/252 |
| 2005/0243834 A1* | 11/2005 | Fukuda | 370/395.1 |
| 2006/0072614 A1* | 4/2006 | Ogiso et al. | 370/474 |
| 2006/0245384 A1* | 11/2006 | Talukdar et al. | 370/310 |
| 2007/0030848 A1* | 2/2007 | Miyata et al. | 370/389 |
| 2007/0060139 A1* | 3/2007 | Kim et al. | 455/445 |
| 2008/0137573 A1* | 6/2008 | Cave et al. | 370/310 |
| 2009/0287843 A1* | 11/2009 | Morimura | 709/236 |
| 2009/0290496 A1* | 11/2009 | Sarhan et al. | 370/242 |

* cited by examiner

METHOD AND APPARATUS RELATED TO PACKET FRAGMENTATION AND RECONSTRUCTION

FIELD

Various embodiments relate to wireless communications, and more particularly, to methods and apparatus related to packet fragmentation and reconstruction.

BACKGROUND

In some wireless networks, packets are fragmented and regrouped to generate a data segment that can be transmitted through the physical layer. Typically, the wireless communications device is made aware of the precise amount of data intended to be communicated in the segment when performing the fragmentation and grouping operations and thus may include information in a header indicating the precise amount of information being communicated by the segment.

In a wireless communications system including mobile nodes, channel conditions between a transmitter and receiver often vary over time. Different amounts of data can be reliably communicated in the same size transmission segment at different times depending upon the current channel conditions. In order to efficiently utilize the air link resources, it would be beneficial if a wireless communications device could delay its decision as to the data rate to be used for a transmission segment until as close as possible to the transmission, so that it can rely on the most current channel condition information. A wireless terminal typically relies on a determined data rate to be used in an upcoming segment when performing fragmentation and header generation operations. If a wireless terminal is to use a high data rate and communicate a large amount of data in a transmission segment, it may need a relatively large amount of time to perform the packet fragmentation and header generation operations. This processing time delay tends to push back the decision point for the data rate to use for the segment, and thus the decision as to which rate to use is being based on older, e.g., less reliable, channel condition information. To take into account potential variation in channel conditions from time of the selection of the rate to the time of actual transmission, one may lower an allowable data rate corresponding to a particular measured channel quality, which tends to lower throughput in the system.

Based on the above discussion there is a need for new methods and apparatus that support packet fragmentation and reconstruction, yet do not require the precise amount of data to be communicated in the segment to be known at the time at least some fragmentation and grouping operations are performed. It would be desirable if, in some embodiments, one or more header generation operations could be performed without knowing with certainty the amount of data which will be transmitted in a segment.

SUMMARY

Methods and apparatus related to packet fragmentation and reconstruction are described. Various described methods and apparatus are well suited for wireless communications systems including mobile nodes, e.g., peer to peer wireless communications systems where channel conditions may rapidly change and/or where the available air link resources are scarce. In some embodiments, a sequence of bits is generated including at least one header and at least a partial packet payload prior to a determination of the actual data rate to be used in a communications segment. In some such embodiments, the generated sequence of bits corresponds to a prepared information bit stream for a best case scenario in which the highest data rate is selected for segment. Various embodiments allow for the selection of the data rate to be used for the communications segment to be delayed until just prior to the transmission. Thus the selection of the data rate for the communications segment can be based on more current channel condition information than would otherwise be possible if the communications device needed to know the data rate for the segment before performing one or more header and packet fragmentation generation operations. This approach allows for more efficient use of the available air link resources than in systems requiring knowledge of the actual data rate and thus segment capacity prior to header generation.

In some embodiments, if the highest possible data rate is selected for the segment the entire generated sequence of bits is communicated in the segment. However, if a lower alternative data rate is selected for the communications segment, then a truncated portion of the generated sequence is communicated. A feature, of some but not necessarily all embodiments, is the inclusion of a header including one or more of a Length Field, a More Fragments Field, and an Offset Field. Information conveyed in the Length Field and/or the More Fragments Field may, at times, appear to disagree with the actual transmission which occurred in communications segment, e.g., under the case where only a truncated portion of the generated bit sequence was communicated. Information conveyed in the Length Field, More Fragments Field, and/or Offset Field is used in combination with rate information corresponding to the actual transmission for the segment to reconstruct a fragmented packet.

An exemplary communications method, in accordance with some embodiments, comprises: generating a first sequence of M bits communicating a first packet header and a packet payload corresponding to said first packet header, said first packet header indicating a full length of said packet payload; and transmitting N of said M bits, said N bits including a portion of said packet payload. The exemplary method further comprises: when the portion of said packet payload is less than the indicated full length of said packet payload, forming a second sequence of X bits communicating a second packet header and part of a remainder portion of said packet payload, said second packet header indicating a length less than the indicated full length of said packet payload, X, M and N being positive integers. An exemplary communications device, in accordance with some embodiments, comprises: at least one processor configured to: generate a first sequence of M bits communicating a first packet header and a packet payload corresponding to said first packet header, said first packet header indicating a full length of said packet payload; transmit N of said M bits, said N bits including a portion of said packet payload; and form a second sequence of X bits communicating a second packet header and part of a remainder portion of said packet payload when the portion of said packet payload is less than the indicated full length of said packet payload, said second packet header indicating a length less than the indicated full length of said packet payload, X, M and N being positive integers. The exemplary communications device further includes memory coupled to said at least one processor.

An exemplary communications method in accordance with some embodiments includes: receiving in a first transmission segment a first packet header and a corresponding first packet payload portion, said first packet header indicating a first packet payload length; and determining if a length of the first packet payload portion is less than the indicated first packet payload length. The exemplary method further comprises: when it is determined that the length of the first packet payload portion is less than the indicated first packet payload length, storing the received first packet payload portion; and combining the stored first packet payload portion with a second packet payload portion received in a second communication segment.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION

Figure 1:
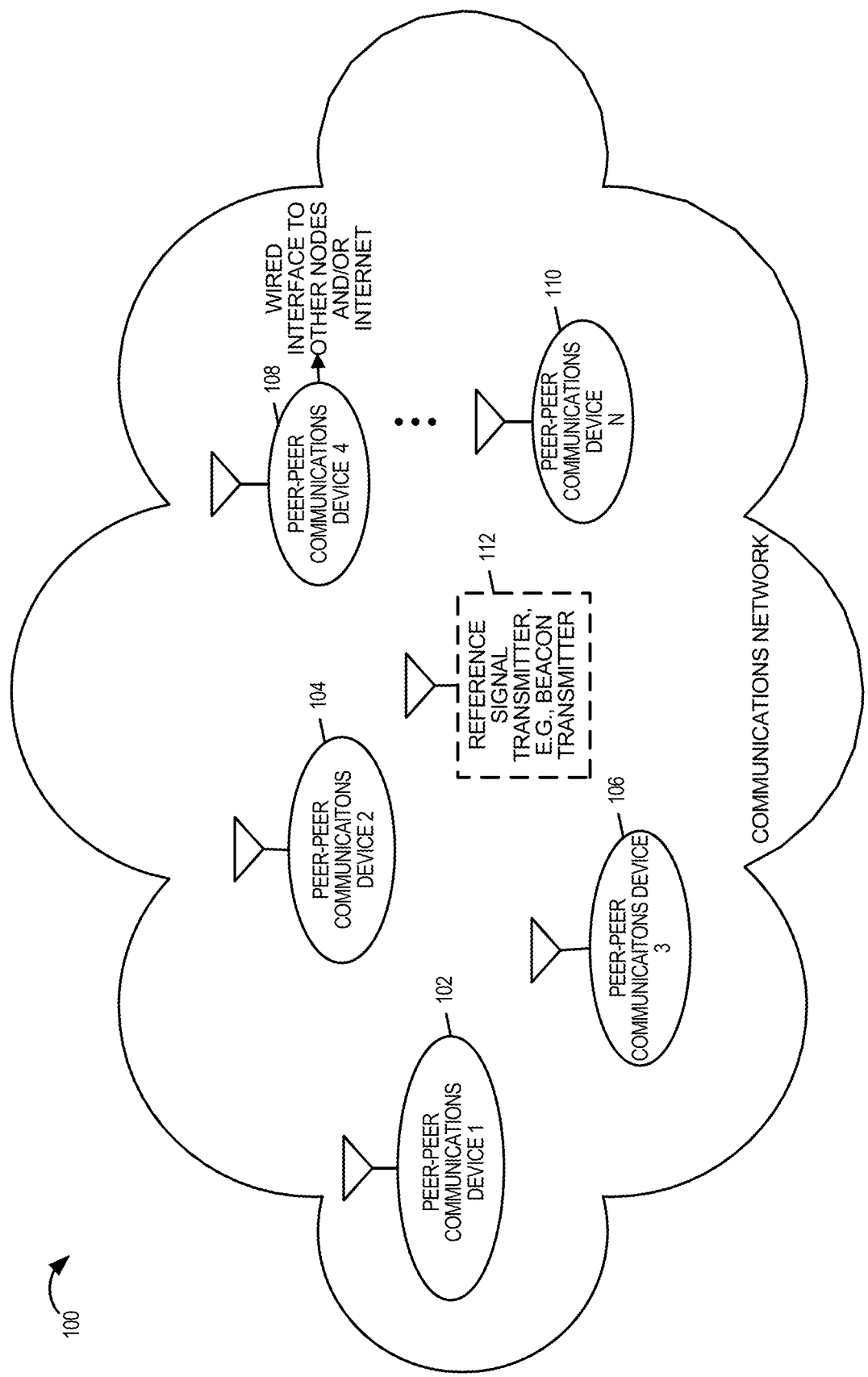
FIG. 1 is a drawing of an exemplary wireless communications system in accordance with an exemplary embodiment.

FIG. 1 is a drawing of an exemplary peer to peer communications network 100, e.g., an ad-hoc communications network, in accordance with an exemplary embodiment. The exemplary communications network 100 supports efficient peer to peer signaling between communication devices, e.g., mobile and/or stationary wireless communications devices. The communications devices of network 100 implement packet fragmentation and reconstruction methods in accordance with an exemplary embodiment. Features of some embodiments facilitate the communication of packet portions corresponding to the same packet in different transmission segments. In some embodiments, information included in a header, e.g., a link layer header prepared before the data rate for the segment is decided, is used in combination with data rate information corresponding to the communications segment to reassemble a packet.

Exemplary peer to peer network 100 includes a plurality of wireless peer to peer communications devices (peer to peer communications device 1 102, peer to peer communications device 2 104, peer to peer communications device 3 106, peer to peer communications device 4 108, . . . , peer to peer communications device N 110) supporting peer to peer signaling. In some embodiments, the network 100 includes a reference signal transmitter 112, e.g., a beacon transmitter. The wireless devices (102, 104, 106, 108, . . . , 110) in the communications network 100 can establish connections with one another, e.g., peer to peer connections, and communicate packets between one another. In some embodiments, there is a recurring timing structure used in the network 100. In some such embodiments a reference signal, e.g., an OFDM beacon signal from reference signal transmitter 112, is used by a wireless device to synchronize with respect to the timing structure. Alternatively, a signal used to synchronize with the timing structure may be sourced from another device, e.g., a GPS transmitter, a base station or another peer to peer device.

Figure 2:
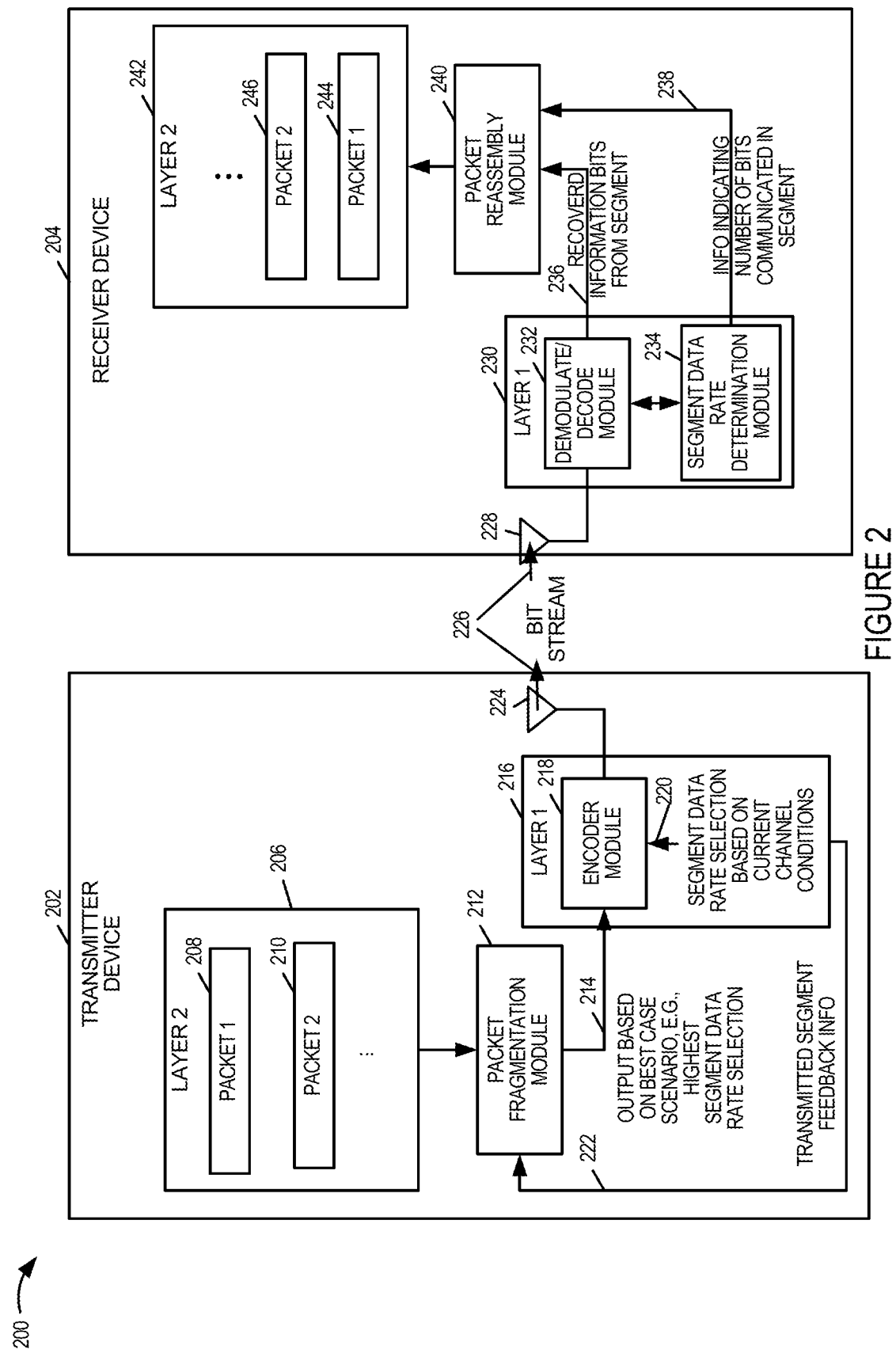
FIG. 2 is a drawing of an exemplary first communications device communicating with an exemplary second communications device in accordance with an exemplary embodiment.

FIG. 2 is a drawing of an exemplary first communications device, transmitter device 202, communicating with an exemplary second communications device, receiver device 204, in accordance with an exemplary embodiment. Devices (202, 204) are, e.g., any of the exemplary peer to peer communications devices of network 100 of FIG. 1. Exemplary transmitter device 202 includes a plurality of layer 2 packets (packet 1 208, packet 2 210, . . . ) that it would like to communicate to receiver device 204. Transmitter device 202 and/or receiver device 204 are, e.g., mobile communications devices, and the communications channel between transmitter device 202 and receiver device 204 may be changing over time. At different times, a different number of information bits can be communicated in a transmission segment over the airlink depending upon current channel conditions. Transmitter device 202 includes a packet fragmentation module 212 which fragments layer 2 packets and generates an output, which is an input to the layer 1 module 216 including an encoder module 218. It is desirable to select the data rate setting of encoder module 218 close to the actual transmission time, so that the selection can be based on current channel condition information. However, the packet fragmentation module 212 performs its operations at a prior time and is not aware of what the channel conditions will be when encoder module 218 sets its rate selection. Thus packet fragmentation module 212 is unaware of the actual number of bits that encoder module 218 will encode for a particular transmission segment.

It may not be practical for packet fragmentation module 212 to generate and send encoder module 218 a plurality of different sets of inputs corresponding to each of the potential segment data rate selection options which encoder module 218 may select, e.g., due to time constraints and/or due to a large number of potential different rate options that may be selected. In accordance with a feature of this embodiment, packet fragmentation module 212 generates its output based on a best case scenario, e.g., module 212 generates an output to encoder module 218 based on the highest data rate selection option being chosen, e.g., a maximum number of bits that can be communicated in the transmission segment based on best case conditions. Encoder module 218 of layer 1 module 216 receives the output based on the best case scenario 214, selects a segment data rate based on current channel conditions 220, encodes and modulates at least a portion of the received input 214 and generates an output bit stream 226 which it transmits over the airlink from its antenna 224 to antenna 228 of receiver device 204. If the selected data rate 220 is a data rate below the best case scenario, then a partial portion of the information 214 rather than the full set of information 214 is communicated in the transmission segment, e.g., a truncated portion of information 214 is communicated in the transmission segment. In accordance with another feature, some information, under such a scenario, in a header portion of the truncated portion of information, e.g., length information, does not accurately describe the transmission. However, if the best case rate was selected, then the header information would have accurately described the transmission.

Based on the segment data rate selection 220, feedback information describing the actual transmission 222 is sent back to packet fragmentation module 212. In this way packet fragmentation module 212 can identify which bits of information 214 were actually transmitted and which were not, so as to be able to incorporate untransmitted information bits in a subsequent generated output fed to the input of encoder module 218.

In some embodiments, Layer 2 performs packet fragmentation and adds a link header according to the maximum rate option available. Layer 2 then passes the maximum number of information words (uncoded) to Layer 1. At his point the Layer 1 takes one of two different approaches, e.g., depending upon the implementation. In a first approach, Layer 1 waits until it gets the current rate option to be used for the segment and decides on the number of words it can transmit in this segment. Layer 2 then passes the decided number of words into an encode/modulate/transmitter module for encoding, modulation and transmission. In a second approach, Layer 1 passes each of the information words from Layer 2 to an encoder to generate codewords, and after Layer 1 gets the current rate option to be used for the segment, it decides on the number of codewords to be transmitted in this segment. Layer 1 then passes the decided number of codewords into a modulate/transmitter module, for modulation and transmission.

The receiver device 204 includes a receive antenna 228 coupled to a layer 1 module 230. The layer 1 module 230 includes a demodulate/decode module 232 and a segment data rate determination module 234. Demodulate/decode module 232 processes received signals conveying the received bit stream 226 and obtains recovered information bits from the transmission segment 236, e.g., a packet portion, which is fed as input to packet reassembly module 240. Segment data rate determination module 234 determines the data rate for transmission segment via which recovered information bits 236 are communicated. In some embodiments, information identifying the data rate for the segment is communicated as an in-band signal in the segment. Information indicating the number of information bits being communicated in the segment 238, an output of module 234, is sent to packet reassembly module 240.

The receiver device 204 is aware of the bit encoding methodology being used by transmitter device 202. Thus receiver device 204 is aware that some information included in a header field of recovered information bits for a segment 236, e.g., length information, may not match the actual information communicated in the segment, e.g., depending upon whether or not the highest rate option was used for the segment. Information indicating the number of bits communicated in the segment 238 is used by packet reassembly module 240 to properly interpret the recovered information bits from the segment and reconstitute packets. Recovered layer 2 packets (packet 1 244, packet 2 246, . . . ) are outputs of packet reassembly module 240.

Figure 3:
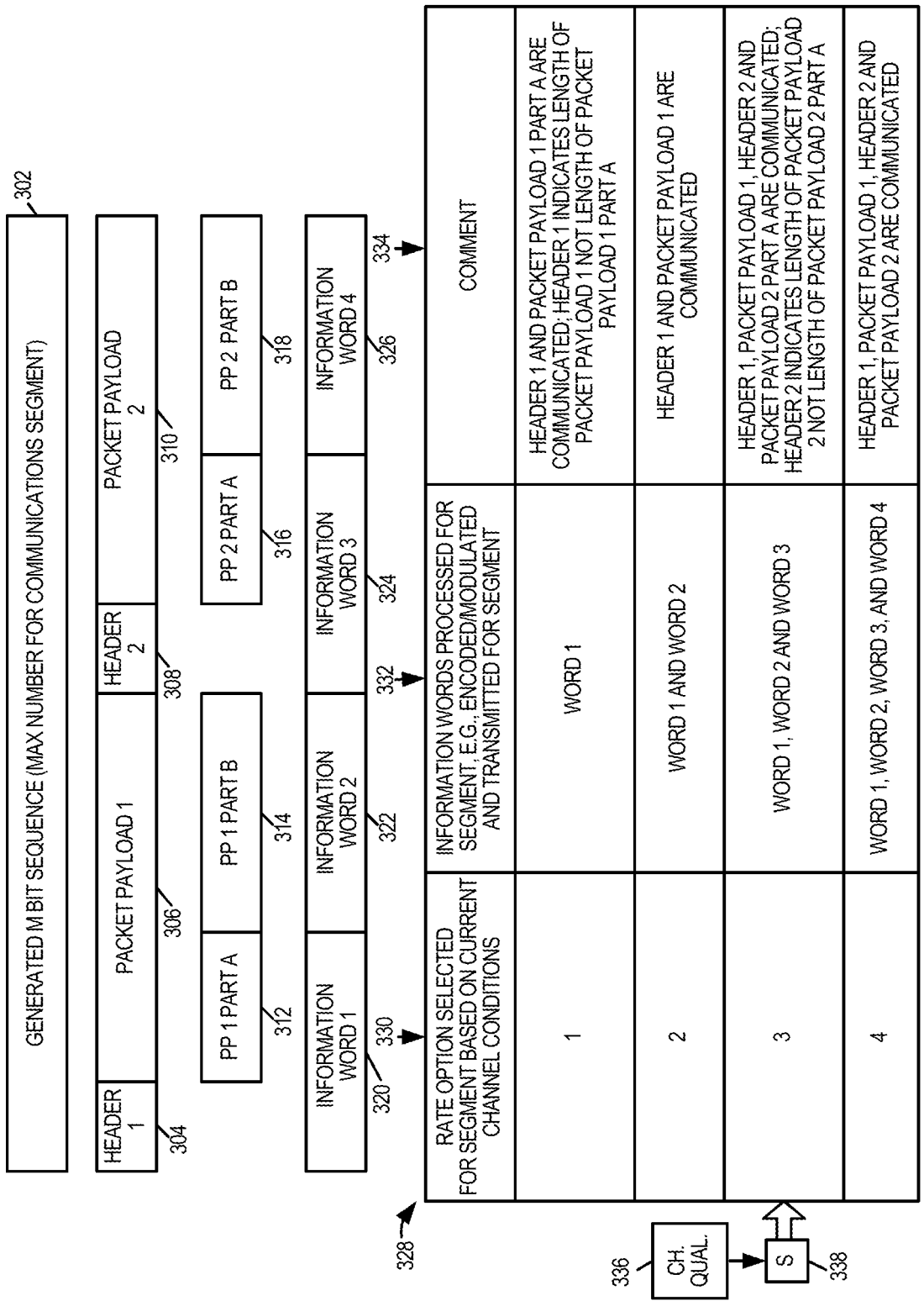
FIG. 3 is a drawing illustrating an exemplary generated bit sequence corresponding to a communications segment, rate option related information, and an exemplary rate option selection in accordance with an exemplary embodiment.

FIG. 3 is a drawing illustrating an exemplary generated bit sequence corresponding to a communications segment, rate option related information, and an exemplary rate option selection in accordance with an exemplary embodiment. FIG. 3 includes a generated M bit sequence 302, where M is the maximum number of information bits that can be communicated in the communications segment. The generated M bit sequence 302 is, e.g., output 214 of packet fragmentation module 212 of FIG. 2. The generated M bit sequence 302 includes header 1 304, packet payload 1 306, header 2 308 and packet payload 2 310. The generated M bit sequence 302 can also be partitioned into information words (information word 1 320, information word 2 322, information word 3 324, information word 4 326). Packet payload 1 306 can be partitioned into packet payload 1 part A 312 and packet payload 1 part B 314. Packet payload 2 310 can be partitioned into packet payload 2 part A 316 and packet payload 2 part B 318.

The generated M bit sequence 302 is available for transmission. Based on the rate option selection, the entire M bit sequence is encoded/modulated/transmitted or a partial portion of the generated M bit sequence is encoded/modulated/transmitted, e.g., a truncated portion. The rate option is selected based on a current channel quality determination. In some embodiments, if the determined quality of the communications channel is above a predetermined limit, the highest rate option is selected and the full set of M bits is communicated in the communications segment. Table 328 describes four exemplary rate options, lists which information words are to be communicated corresponding to each rate option, and describes information communicated corresponding to each rate option. The first column 330 lists four exemplary rate options that may be selected for the segment based on current channel conditions. The second column 332 lists the information words processed for the segment, e.g., information words which are encoded/modulated/transmitted for the segment. The third column 334 comments on the information communicated.

If rate option 1 is selected, information word 1 320 is communicated. For rate option 1, header 1 304 and packet payload 1 part A 312 are communicated. In this scenario, header 1 304 indicates that length of packet payload 1 306 not the length of packet payload 1 part A 312.

If rate option 2 is selected, information word 1 320 and information word 2 322 are communicated. For rate option 2, header 1 304 and packet payload 1 306 are communicated. In this scenario, header 1 304 indicates the length of packet payload 1 306.

If rate option 3 is selected, information word 1 320, information word 2 322 and information word 3 324 are communicated. For rate option 3, header 1 304, packet payload 1 306, header 2 308 and packet payload 2 part A 316 are communicated. In this scenario, header 1 304 indicates the length of packet payload 1 306; however, header 2 308 indicates the length of packet payload 2 310 and not the length of packet payload 2 part A 316.

If rate option 4 is selected, information word 1 320, information word 2 322, information word 3 324, and information word 4 326 are communicated. For rate option 4, header 1 304, packet payload 1 306, header 2 308 and packet payload 2 310 are communicated. In this scenario, header 1 304 indicates the length of packet payload 1 306, and header 2 308 indicates the length of packet payload 2 310.

For the purposes of this example, consider that the wireless device which generated the M bit sequence 302 makes channel quality determination 336 and then selects rate option 3 based on the channel quality determination as indicated by block/arrow 338. In such a situation the wireless device communicates, in the communications segment, the N bits of information words (word 1 320, word 2 322 and word 3 324), where N is an integer which is less than M.

Figure 4:
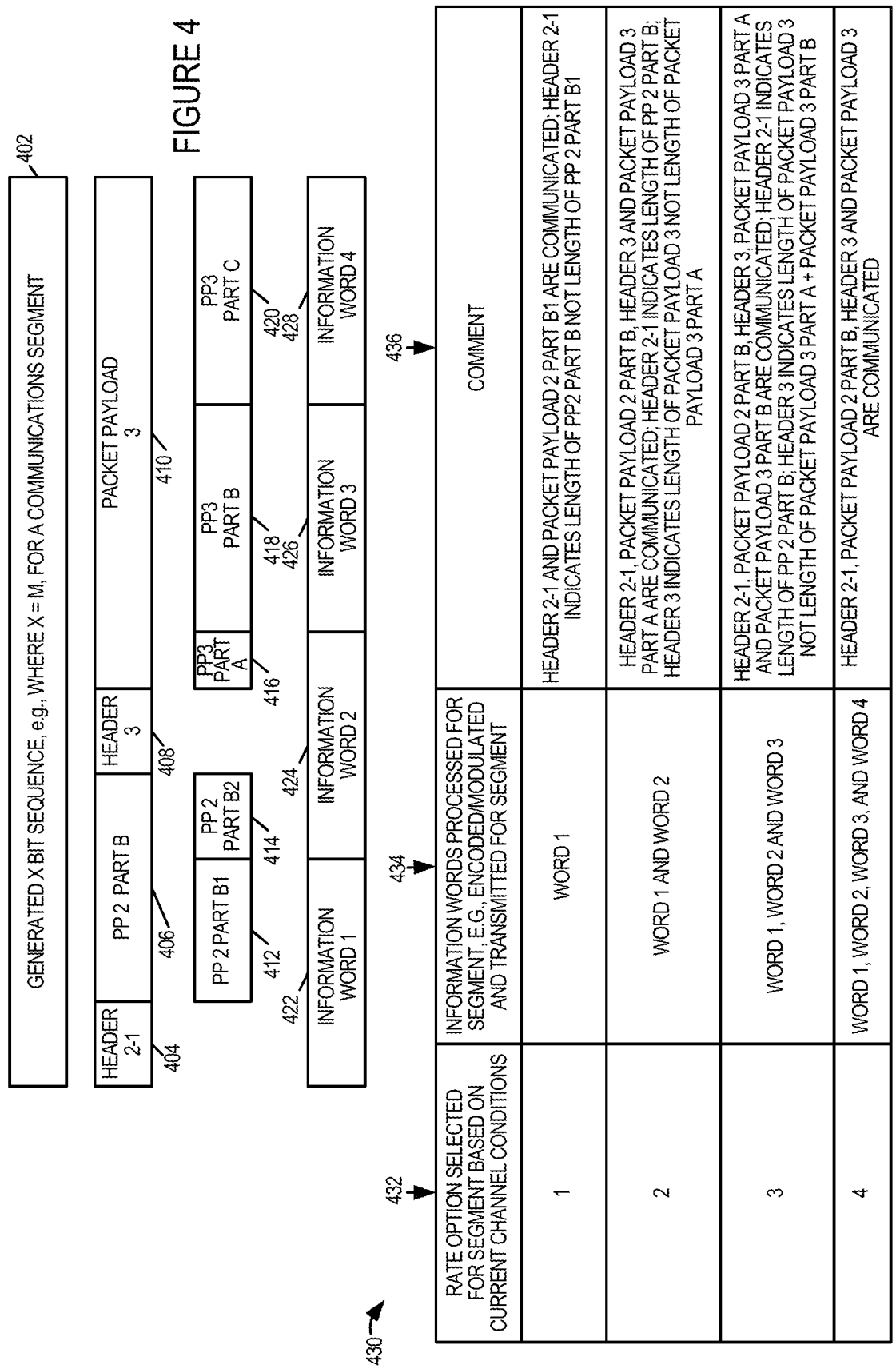
FIG. 4 is a drawing illustrating an exemplary generated bit sequence corresponding to a subsequent communications segment and rate option related information.

FIG. 4 is used to continue the example presented in FIG. 3. FIG. 4 is a drawing illustrating an exemplary generated bit sequence corresponding to another communications segment, rate option related information, and an exemplary rate option selection in accordance with an exemplary embodiment. FIG. 4 includes a generated X bit sequence 402, e.g., where X=M, for the another communications segment. The generated X bit sequence 402 is, e.g., output 214 of packet fragmentation module 212 of FIG. 2 corresponding to a second iteration. The generated X bit sequence includes header 2-1 404, packet payload 2 part B 406, header 3 408 and packet payload 3 410. In some embodiments, packet payload 2 part B 406 is packet payload 2 part B 318 of FIG. 3. The generated X bit sequence 402 can also be partitioned into information words (information word 1 422, information word 2 424, information word 3 426, information word 4 428). Packet payload 2 part B 406 can be partitioned into packet payload 2 part B1 412 and packet payload 2 part B2 414. Packet payload 3 410 can be partitioned into packet payload 3 part A 416, packet payload 3 part B 418, and packet payload 3 part C 420.

The generated X bit sequence 402 is available for transmission. Based on the rate option selection, the entire X bit sequence is encoded/modulated/transmitted or a partial portion of the generated X bit sequence is encoded/modulated/transmitted, e.g., a truncated portion. The rate option is selected based on a current channel quality determination. Table 430 describes four exemplary rate options, lists which information words are to be communicated corresponding to each rate option, and describes information communicated corresponding to each rate option. The first column 432 lists four exemplary rate options that may be selected for the segment based on current channel conditions. The second column 434 lists the information words processed for the segment, e.g., information words which are encoded/modulated/transmitted for the segment. The third column 436 comments on the information communicated.

If rate option 1 is selected, information word 1 422 is communicated. For rate option 1, header 2-1 404 and packet payload 2 part B1 412 are communicated. In this scenario, header 2-1 404 indicates the length of packet payload 2 part B 406 not the length of packet payload 2 part B1 412.

If rate option 2 is selected, information word 1 422 and information word 2 424 are communicated. For rate option 2, header 2-1 404, packet payload 2 part B 406, header 3 408 and packet payload 3 part A 416 are communicated. In this scenario, header 2-1 404 indicates the length of packet payload 2 part B 406; header 3 408 indicates the length of packet payload 3 410 and not the length of packet payload 3 part A 416.

If rate option 3 is selected, information word 1 422, information word 2 424 and information word 3 426 are communicated. For rate option 3, header 2-1 404, packet payload 2 part B 406, header 3 408, packet payload 3 part A 416, and packet payload 3 part B 418 are communicated. In this scenario, header 2-1 404 indicates the length of packet payload 2 part B 406; however, header 3 408 indicates the length of packet payload 3 410 and not the length of the combination of packet payload 3 part A 416+packet payload 3 part B 418.

If rate option 4 is selected, information word 1 422, information word 2 424, information word 3 426, and information word 4 428 are communicated. For rate option 4, header 2-1 404, packet payload 2 part B 406, header 3 408 and packet payload 3 410 are communicated. In this scenario, header 2-1 404 indicates the length of packet payload 2 part B 406, and header 3 408 indicates the length of packet payload 3 410.

Depending upon a channel quality estimate subsequent to the generation of the X bit sequence 402, one of the alternative rate options of table 430 are selected, and Y of the X bits are communicated in this communications segment. For rate options 1, 2 and 3 Y is an integer which is less than X; however for rate option 4 Y=X.

Figure 5:
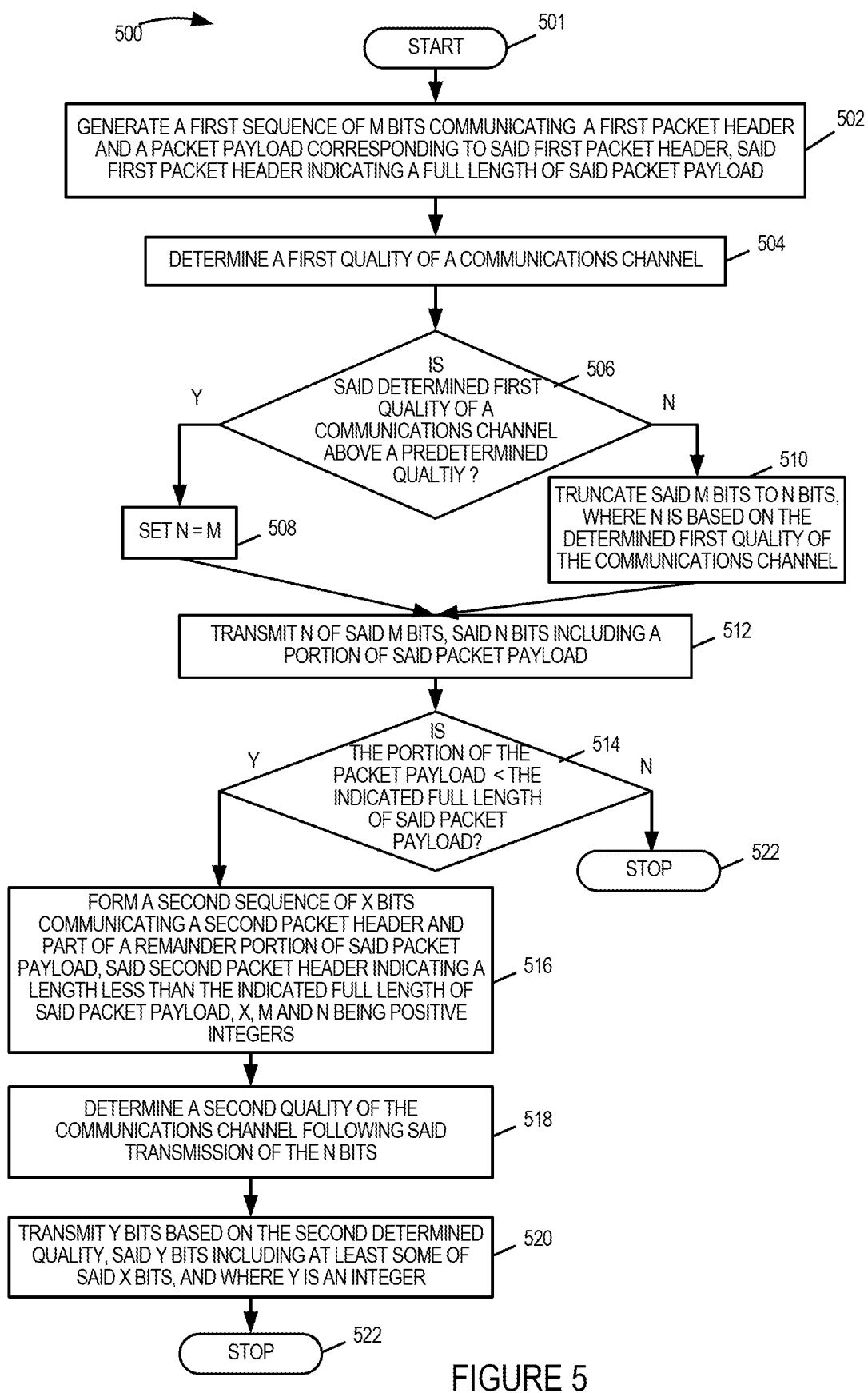
FIG. 5 is a flowchart of an exemplary communications method performed by a communications device in accordance with an exemplary embodiment.

FIG. 5 is a flowchart 500 of an exemplary communications method performed by a communications device in accordance with an exemplary embodiment. The communications device is, e.g., one of the exemplary peer to peer communications device of network 100 of FIG. 1. Operation starts in step 501 where the communications device is powered on and initialized and proceeds to step 502.

In step 502 the communications device generates a first sequence of M bits communicating a first packet header and a packet payload corresponding to said first packet header, said first packet header indicating the full length of said packet payload. In some embodiments M is a maximum number of bits which can be transmitted in a communications segment. At times, the first sequence of M bits includes a plurality of packet headers and a plurality of packet payloads, said first packet header and said packet payload being part of said first sequence. Operation proceeds from step 502 to step 504.

In step 504 the communications device determines a first quality of a communications channel. Operation proceeds from step 504 to step 506. In step 506 the communications device compares said determined first quality of a communications channel to a predetermined quality. If the determined first quality of the communications channel is above a predetermined quality, then operation proceeds from step 506 to step 508, in which the communications device sets N=M. However, if the determined first quality of the communications channel is not above a predetermined quality, then operation proceeds from step 506 to step 510.

In step 510 the communications device truncates said M bits to N bits, where N is a number based on the determined first quality of the communications channel. Operation proceeds from step 508 or step 510 to step 512.

In step 512 the communications device transmits N of said M bits, said N bits including a portion of said packet payload. In some embodiments, the N bits are transmitted in encoded and modulated form, and time between said determining and said transmitting is less than time between said generating and said transmitting. Operation proceeds from step 512 to step 514.

In step 514 the communications device determines whether or not the portion of the packet payload is less than the indicated full length of said packet payload. If the portion of the packet payload is less than the indicated full length, then operation proceeds from step 514 to step 516. However, if the portion of the packet payload is not less than the indicated full length of said packet payload, then operation proceeds from step 514 to stop step 522.

Returning to step 516, in step 516 the communications device forms a second sequence of X bits communicating a second packet header and part of a remainder portion of said packet payload, said second packet header indicating a length less than the full length of said packet payload, X, M and N being positive integers. In some embodiments, X is equal to M.

Operation proceeds from step 516 to step 518. In step 518 the communications device determines a second quality of the communications channel following said transmission of the N bits. Then in step 520 the communications device transmits Y bits based on the second determined quality, said Y bits including at least some of said X bits, and where Y is an integer. For example, Y may be less than X due to a bad channel as determined by the second quality determination. In such a situation, at least a third transmission is required. Operation proceeds from step 520 to end step 522.

Figure 6:
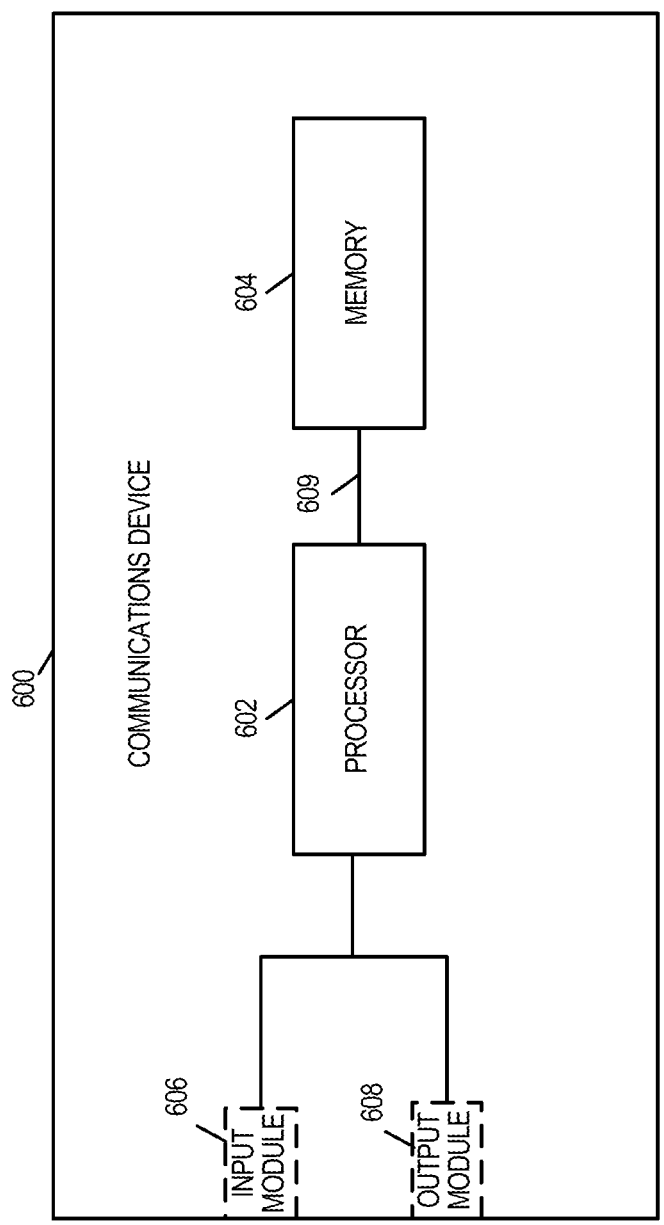
FIG. 6 is a drawing of an exemplary communications device in accordance with an exemplary embodiment.

FIG. 6 is a drawing of an exemplary communications device 600 in accordance with an exemplary embodiment. Exemplary communications device 600 is, e.g., one of the exemplary peer to peer communications devices of network 100 of FIG. 1. Exemplary communications device 600 implements a method in accordance with flowchart 600 of FIG. 6.

Communications device 600 includes a processor 602 and memory 604 coupled together via a bus 609 over which the various elements (602, 604) may interchange data and information. Communications device 600 further includes an input module 606 and an output module 608 which may be coupled to processor 602 as shown. However, in some embodiments, the input module 606 and output module 608 are located internal to the processor 602. Input module 606 can receive input signals. Input module 606 can, and in some embodiments does, include a wireless receiver and/or a wired or optical input interface for receiving input. Output module 608 may include, and in some embodiments does include, a wireless transmitter and/or a wired or optical output interface for transmitting output.

Processor 602 is configured to: generate a first sequence of M bits communicating a first packet header and a packet payload corresponding to said first packet header, said first packet header indicating a full length of said packet payload; transmit N of said M bits, said N bits including a portion of said packet payload; and form a second sequence of X bits communicating a second packet header and part of a remainder portion of said packet payload when the portion of said packet payload is less than the indicated full length of said packet payload, said second packet header indicating a length less than the indicated full length of said packet payload, X, M and N being positive integers.

In some embodiments, processor 602 is further configured to: determine a first quality of a communications channel; and truncate said M bits to N bits, where N is based on the determined first quality of the communications channel. In some such embodiments, said N bits are transmitted in encoded and modulated form, time between said determining and said transmitting being less than time between said generating and said transmitting. In some embodiments, X is equal to M.

The first sequence of M bits, may and sometimes does, include a plurality of packet headers and a plurality of packet payloads, and said first packet header and said packet payload being part of said first sequence. In various embodiments, M is a maximum number of bits which can be transmitted in a communications segment.

At times, when said determined first quality of a communications channel is above a predetermined quality, processor 602 is configured so that N is equal to M.

Processor 602 may be, and sometimes is, further configured to: determine a second quality of the communications channel following said transmission of the N bits; and transmit Y bits based on the second determined quality, e.g., where Y may be the number of bits which can be transmitted in a segment having the second determined quality, said Y bits including at least some of said X bits, and where Y is an integer. Y may be, and sometimes is less than the remainder portion from the untransmitted M bits included the X bits, e.g., due to a bad channel. In such a situation the processor 602 may be configured to perform at least a third transmission.

Figure 7:
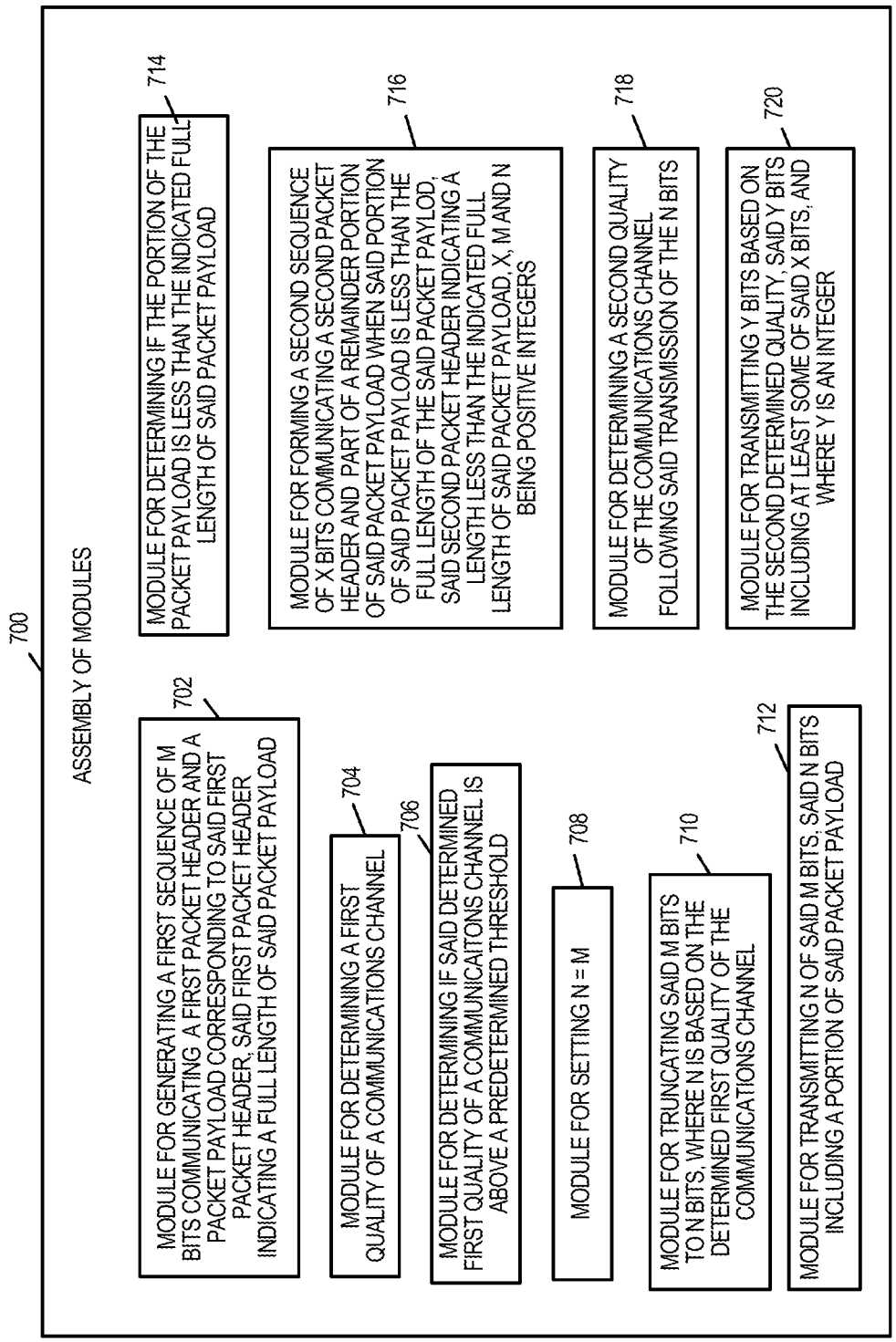
FIG. 7 is an assembly of modules which can, and in some embodiments are, used in the communications device illustrated in FIG. 6.

FIG. 7 is an assembly of modules 700 which can be, and in some embodiments are, used in the communications device 600 illustrated in FIG. 6. The modules in the assembly 700 can be implemented in hardware within the processor 602 of FIG. 6, e.g., as individual circuits. Alternatively, the modules may be implemented in software and stored in the memory 604 of the communications device 600 shown in FIG. 6. While shown in the FIG. 6 embodiment as a single processor, e.g., computer, it should be appreciated that the processor 602 may be implemented as one or more processors, e.g., computers. When implemented in software the modules include code, which when executed by the processor, configure the processor, e.g., computer, 602 to implement the function corresponding to the module. In embodiments where the assembly of modules 600 is stored in the memory 604, the memory 604 is a computer program product comprising a computer readable medium comprising code, e.g., individual code for each module, for causing at least one computer, e.g., processor 602, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 7 control and/or configure the communications device 600 or elements therein such as the processor 602, to perform the functions of the corresponding steps illustrated in the method flowchart 500 of FIG. 5.

As illustrated in FIG. 7, the assembly of modules 700 includes: a module 702 for generating a first sequence of M bits communicating a first packet header and a packet payload corresponding to said first packet header, said first packet header indicating a full length of said packet payload, a module 704 for determining a first quality of a communications channel, a module 706 for determining if said determined first quality of a communications channel is above a predetermined threshold, and a module 708 for setting N=M. The exemplary assembly of module 700 further includes a module 710 for truncating said M bits to N bits, where N is based on the determined first quality of the communications channel, a module 712 for transmitting N of said M bits, said N bits including a portion of said packet payload, and a module 714 for determining if the portion of the packet payload is less than the indicated full length of said packet payload. Assembly of modules 700 further includes: a module 716 for forming a second sequence of X bits communicating a second packet header and part of a remainder portion of said packet payload when said portion of said packet payload is less than the full length of said packet payload, said second packet header indicating a length less than the indicated full length of said packet payload, X, M and N being positive integers, a module 718 for determining a second quality of the communications channel following said transmission of the N bits, and a module 720 for transmitting Y bits based on the second determined quality, said Y bits including at least some of said X bits, and where Y is an integer.

Figure 8:
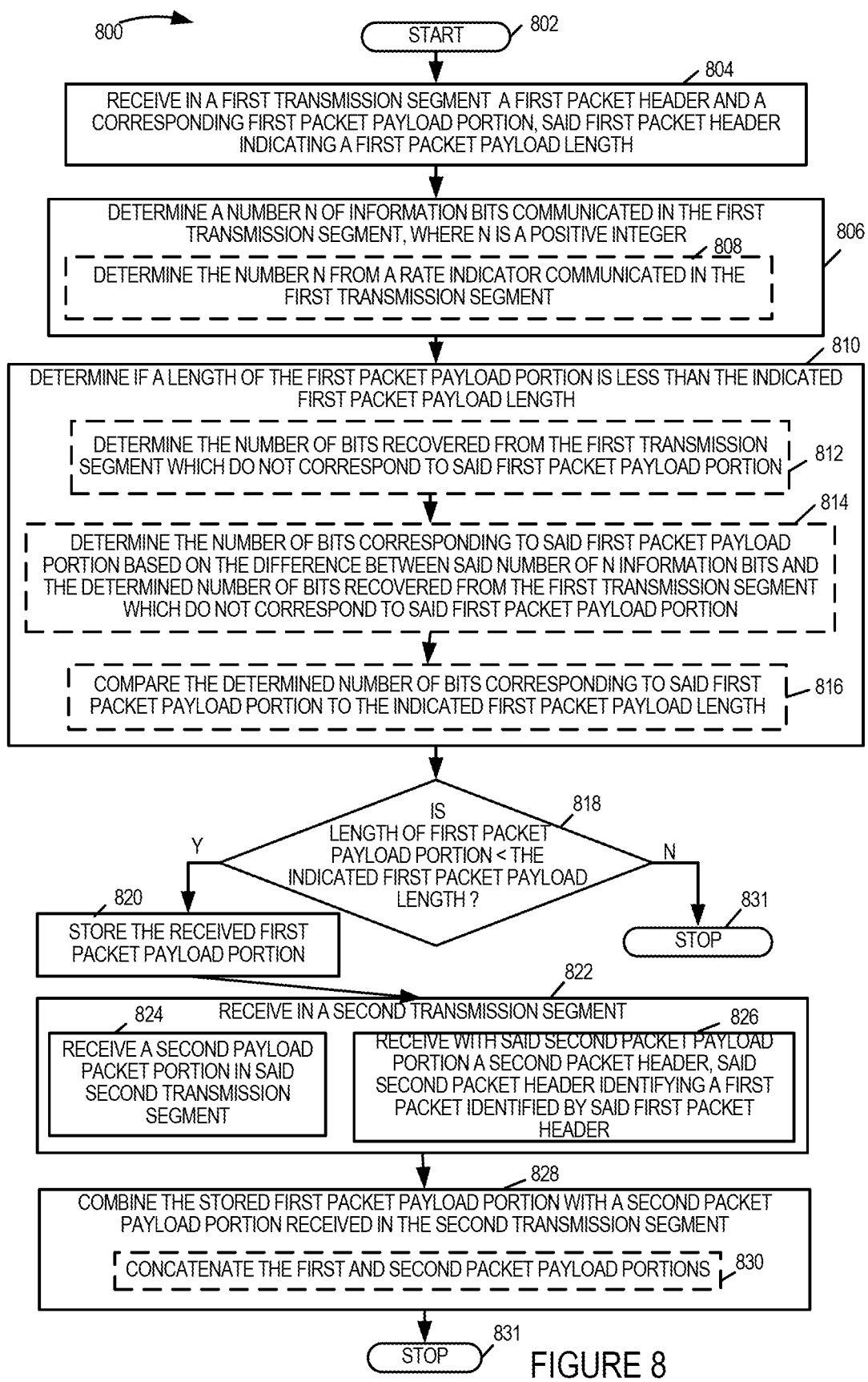
FIG. 8 is a flowchart of an exemplary method of operating a communications device in accordance with an exemplary embodiment.

FIG. 8 is a flowchart 800 of an exemplary method of operating a communications device in accordance with an exemplary embodiment. The communications device is, e.g., one of the exemplary peer to peer communications devices of network 100 of FIG. 1. Operation starts in step 802 where the communications device is powered on and initialized and proceeds to step 804.

In step 804 the communications device receives in a first transmission segment a first packet header and a corresponding first packet payload portion, said first packet header indicating a first packet payload length. Operation proceeds from step 804 to step 806.

In step 806 the communications device determines a number N of information bits communicated in the first transmission segment, where N is a positive integer. In some such embodiments, step 806 includes sub-step 808, in which the communications device determines the number N from a rate indicator communicated in the first transmission segment. In some embodiments, the determining of step 806 is based on a received rate signal. Operation proceeds from step 806 to step 810.

In step 810 the communications device determines if a length of the first packet payload portion is less than the indicated first packet payload length. In some embodiments, step 810 includes sub-steps 812, 814 and 816. In sub-step 812 the communications device determines the number of bits recovered from the first transmission segment which do not correspond to the said first packet payload portion, and in sub-step 814 the communications device determines the number of bits corresponding to said first packet payload portion based on the difference between said number of N information bits and the determined number of bits recovered from the first transmission segment which do not correspond to said first packet payload portion. Operation proceeds from sub-step 814 to sub-step 816. In sub-step 816 the communications device compares the determined number of bits corresponding to the first packet payload portion to the indicated first packet payload length.

Operation proceeds from step 810 to step 818. In step 818, if the length of the first packet payload portion is less than the indicated first packet payload length, then operation proceeds from step 818 to step 820. In step 820, the communications device stores the received first packet payload portion. Operation proceeds from step 820 to step 822.

In step 822 the communications device receives information in a second transmission segment. Step 822 includes sub-steps 824 and 826. In sub-step 824 the communications device receives a second payload packet portion in said second transmission segment. In sub-step 826 the communications device receives, with said second packet payload portion, a second packet header, said second packet header identifying a first packet identified by said first packet header.

Operation proceeds from step 822 to step 828. In step 828 the communications device combines the stored first packet payload portion with a second packet payload portion received in the second transmission segment. Step 828, in some embodiments, includes sub-step 830. In sub-step 830 the communications device concatenates the first and second packet payload portions.

In some embodiments, the first packet header can, and sometimes does, include a first packet fragmentation indicator indicating that the first packet payload portion is an unfragmented packet payload and the second packet payload portion is received with a second packet header including a second packet fragmentation indicator indicating that the second packet payload is a fragmented packet payload. In some such embodiments, the second packet header may, and sometimes does, include a second packet payload length indicator which indicates that the second packet payload is longer than the length of the second packet payload portion. For example, this may occur in a situation where the second transmission segment is too small to hold the full packet fragment.

Figure 9:
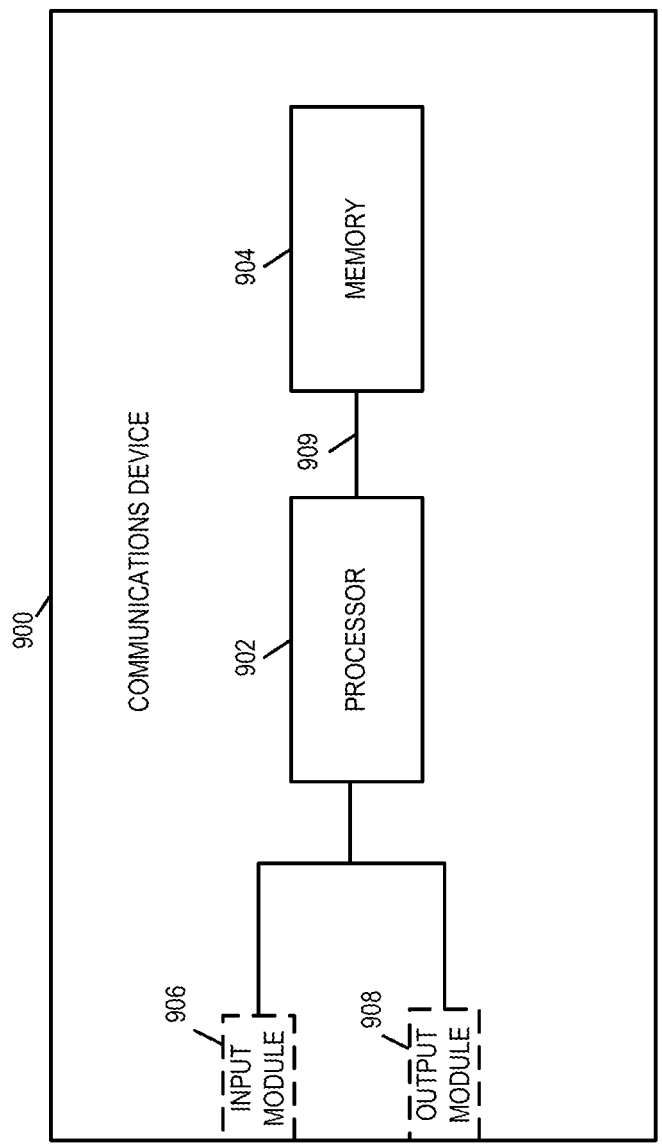
FIG. 9 is a drawing of an exemplary communications device in accordance with an exemplary embodiment.

FIG. 9 is a drawing of an exemplary communications device 900 in accordance with an exemplary embodiment. Exemplary communications device 900 is, e.g., one of the exemplary peer to peer communications devices of network 100 of FIG. 1. Exemplary communications device 900 implements a method in accordance with flowchart 800 of FIG. 8.

Communications device 900 includes a processor 902 and memory 904 coupled together via a bus 909 over which the various elements (902, 904) may interchange data and information. Communications device 900 further includes an input module 906 and an output module 908 which may be coupled to processor 902 as shown. However, in some embodiments, the input module 906 and output module 908 are located internal to the processor 902. Input module 906 can receive input signals. Input module 906 can, and in some embodiments does, include a wireless receiver and/or a wired or optical input interface for receiving input. Output module 908 may include, and in some embodiments does include, a wireless transmitter and/or a wired or optical output interface for transmitting output.

Processor 902 is configured to: receive in a first transmission segment a first packet header and a corresponding first packet payload portion, said first packet header indicating a first packet payload length; determine if a length of the first packet payload portion is less than the indicated first packet payload length; store the received first packet payload portion when it is determined that the length of the first packet payload portion is less than the indicated first packet payload length; and combine the stored first packet payload portion with a second packet payload portion received in a second communication segment.

In some embodiments, processor 902 is further configured to: determine a number N of information bits communicated in the first transmission segment, where N is a positive integer. In some such embodiments processor 902 is configured to: determine the number of bits recovered from said first transmission segment which do not correspond to said first packet payload portion; determine the number of bits corresponding to said first packet payload portion based on the difference between said number of N information bits and the determined number of bits recovered from said first transmission segment which do not correspond to said first packet payload portion; and compare the determined number of bits corresponding to said first packet payload portion to the indicated first packet payload length, as part of being configured to determine if a length of the first packet payload portion is less than the indicated first packet payload length.

Processor 902, in some embodiments, is further configured to receive with said second packet payload portion a second packet header, said second packet header identifying a first packet identified by said first packet header.

In some embodiments, processor 902 is configured to determine the number N from a rate indicator communicated in said first transmission segment as part of being configured to determine the number n of information bits communicated in the first transmission segment. In some embodiments, processor 902 is configured to determine the number N from a received rate indicator signal as part of being configured to determine the number N of information bits communicated in the first transmission segment.

Processor 902, in various embodiments, is configured to concatenate the first and second packet payload portions as part of being configured to combine the stored first packet payload portion with the second packet payload portion.

In some embodiments, said first packet header may, and sometimes does, include a first packet fragmentation indicator indicating that the first packet payload portion is an unfragmented packet payload; and said second packet payload portion is received with a second packet header including a second packet fragmentation indicator indicating that the second packet payload portion is a fragmented packet payload. In some such embodiments, said second packet header includes a second packet payload length indicator which indicates that the second packet payload is longer than the length of the second packet payload portion. For example, the second segment may be too small to hold the full packet fragment.

Figure 10:
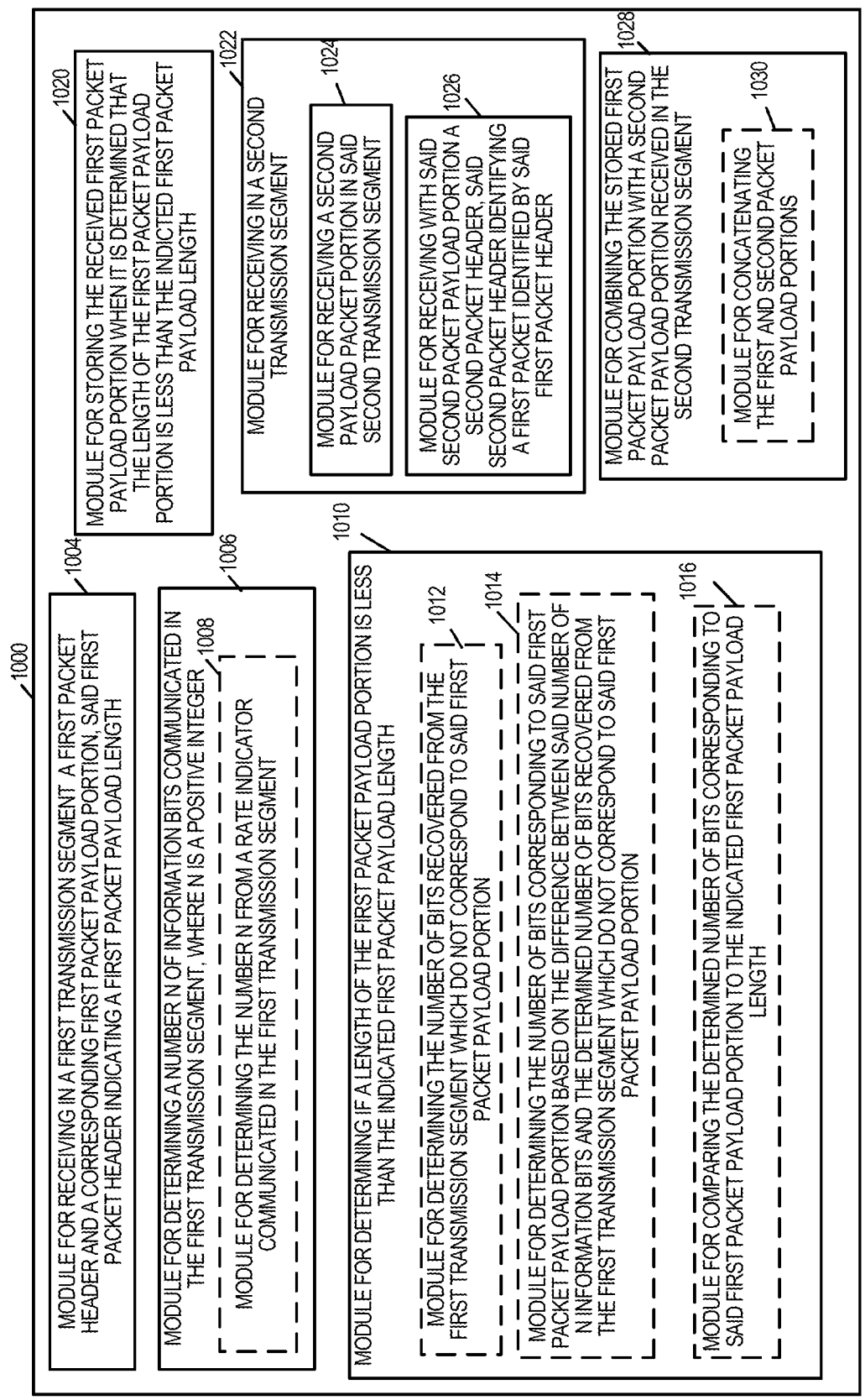
FIG. 10 is an assembly of modules which can, and in some embodiments are, used in the communications device illustrated in FIG. 9.

FIG. 10 is an assembly of modules 1000 which can be, and in some embodiments are, used in the communications device 900 illustrated in FIG. 9. The modules in the assembly 1000 can be implemented in hardware within the processor 902 of FIG. 9, e.g., as individual circuits. Alternatively, the modules may be implemented in software and stored in the memory 904 of the communications device 900 shown in FIG. 9. While shown in the FIG. 9 embodiment as a single processor, e.g., computer, it should be appreciated that the processor 902 may be implemented as one or more processors, e.g., computers. When implemented in software the modules include code, which when executed by the processor, configure the processor, e.g., computer, 902 to implement the function corresponding to the module. In embodiments where the assembly of modules 1000 is stored in the memory 904, the memory 904 is a computer program product comprising a computer readable medium comprising code, e.g., individual code for each module, for causing at least one computer, e.g., processor 902, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 10 control and/or configure the communications device 900 or elements therein such as the processor 902, to perform the functions of the corresponding steps illustrated in the method flowchart 800 of FIG. 8.

Assembly of modules 1000 includes: a module 1004 for receiving in a first transmission segment a first packet header and a corresponding first packet payload portion, said first packet header indicating a first packet payload length, a module 1006 for determining a number N of information bits communicated in the first transmission segment, where N is a positive number, a module 1010 for determining if a length of the first packet payload portion is less than the indicated first packet payload length, a module 1020 for storing the received first packet payload length when it is determined that the length of the first packet payload portion is less than the indicated first packet payload length, a module 1022 for receiving information in a second transmission segment and a module 1028 for combining the stored first packet payload portion with a second packet payload portion received in the second transmission segment.

In some embodiments, module 1006 includes a module 1008 for determining the number N from a rate indicator communicated in the first transmission segment. In some embodiments, module 1006 performs the determining based on a received rate indicator signal, e.g., a received rate indicator signal communicated prior to the first transmission segment.

Module 1010, in various embodiments, includes modules 1012, 1014 and 1016. Module 1012 is a module for determining the number of bits recovered from the first transmission segment which do not correspond to the first packet payload portion, while module 1014 is a module for determining the number of bits corresponding to said first packet payload portion based on the difference between said number of N information bits and the determined number of bits recovered from the first transmission segment which do not correspond to said first packet payload portion. Module 1016 is a module for comparing the determined number of bits corresponding to said first packet payload portion to the indicated first packet payload length.

Module 1022 include module 1024 for receiving a second payload packet portion in said second transmission segment and module 1026 for receiving with said second packet payload portion a second packet header, said second packet header identifying a first packet identified by said first packet header.

Module 1028, in some embodiments, includes a module 1030 for concatenating the first and second packet payload portions.

In some embodiments, the first packet header may, and sometimes does, include a first packet header fragmentation indicator indicating that the first packet payload portion is an unfragmented packet payload and the second packet payload portion is received with a second packet header including a second packet fragmentation indicator indicating that the second packet payload portion is a fragmented packet payload. In some such embodiments, the second packet header may, and sometimes does, include a second packet payload length indicator which indicates that the second packet payload is longer than the second packet payload portion.

In one exemplary embodiment, an exemplary link layer header format is shown in Table 1 below.

TABLE 1

| Field Name | Length (bytes) | Type | Description |
| --- | --- | --- | --- |
| Version | 1 | integer | Set to version number, e.g., 1 |
| Length | 2 | integer | Length of current fragment including each of the higher level headers, in bytes |
| Next Header | 1 | integer | Type of header following the link header, e.g., stream header, authentication header, etc. |
| Link ID | 1 | integer | Identifier of the secure link between the two devices, from the point of view of the recipient of this link layer packet |
| Packet ID/ Sequence Nr. | 2 | integer | Link layer packet identifier, unique for this Link ID and the current security association between the two devices |
| More Fragment Flag | 1 | integer | Set to 0 if this is the last fragment; otherwise set to 1 if there are more fragments |
| Offset | 2 | integer | The byte number of the packet contained in the payload following the headers |

In this exemplary embodiment, in the link layer header, fields involved in fragmentation and reconstruction of link layer packets include the Length, Offset, and More Fragment Flag fields. The following are a few examples illustrating the use of these three fields in fragmentation and reconstruction of link-layer packets.

In a first example, consider that an upper-layer packet has a total length of 100 bytes. The link-layer header generated for this packet would include an offset field=0, length field=100, and More Fragment Field=0. Now suppose that the current data segment (first segment) is only 30 bytes long, e.g., due to current channel conditions. Then it can only ship 20 bytes data and 10 bytes link-layer header out, and the remaining 80 bytes are still in the transmitter side. For purposes of the example, consider that the receiver receives the first data segment and sees that the More Fragment Flag=0. The receiver then performs the calculation that the length of the expected link layer packet=offset field+length field, which is 100. The receiver knows that it only received 20 bytes, so it will wait for the remaining 80 bytes of the same link-layer packet.

In a second example, consider that the second example follows the first example. The link layer header generated for the remaining 80 bytes would include an offset field=20, length field=80, and a More Fragment Field=0. Now suppose that the current data segment (second segment) is 90 bytes long, e.g., due to current channel conditions. Then, it can ship these remaining 80 bytes of data and the 10 bytes link=layer header. For the purpose of the example, consider that the intended receiver receives the data segment, and finds that the More Fragment Field=0. The receiver then performs the calculation that the length of the expected link-layer packet=offset field+length field, which is 100. The receiver knows that it has received, via the combination of the two segments, the full 100 bytes of the link-layer packet. It can ship the entire recovered link-layer packet to the upper-layer.

In a third example, consider that the third example follows the first example. The link layer header generated for the remaining 80 bytes would include an offset field=20, length field=80, and a More Fragment Field=0. Now suppose that the current data segment (second segment) is 90 bytes long, e.g., due to current channel conditions. Then, it can ship these remaining 80 bytes of data and the 10 bytes link=layer header. For the purpose of the example, further consider that the first segment is NAKed, so that the transmitter re-sends the first 20 bytes in a third segment with a link layer header including an offset field=0, length field=20 and More Fragments Flag=1. From the receiver's perspective, consider that the receiver receives the second data segment and successfully recovers the information communicated. The receiver performs the calculation that the length of the expected link-layer packet=offset field+length field, which is 100. The receiver knows that it has received and successfully recovered 80 bytes, so it will wait for the remaining 20 bytes of the same link-layer packet. After receiving and successfully recovering the information of the third data segment, the receiver knows that it has received and recovered the entire 100 bytes of the link-layer packet, so it can ship the entire link-layer packet to the upper-layer.

In the first example, in some embodiments, if the first segment size was larger, e.g., due to better channel conditions, the transmitter would have communicated the same link-layer header but with more bytes of the upper-layer packet. In contrast to other approaches in which the length information in the link-layer header consistently matches the amount of bytes actually communicated in the segment, at least some embodiments described herein allow for the link layer information, which is desired to be transmitted, to be prepared before a decision is reached as to actually how much data is to be sent in the communications segment. Thus the decision, as to how much data is to be actually transmitted in the segment, can be put off until a point closer to the actual transmission allowing for more current channel condition information to be used in making the decision. This can result in more efficient use of air link resources and potentially higher overall throughput in the system.

Figure 11:
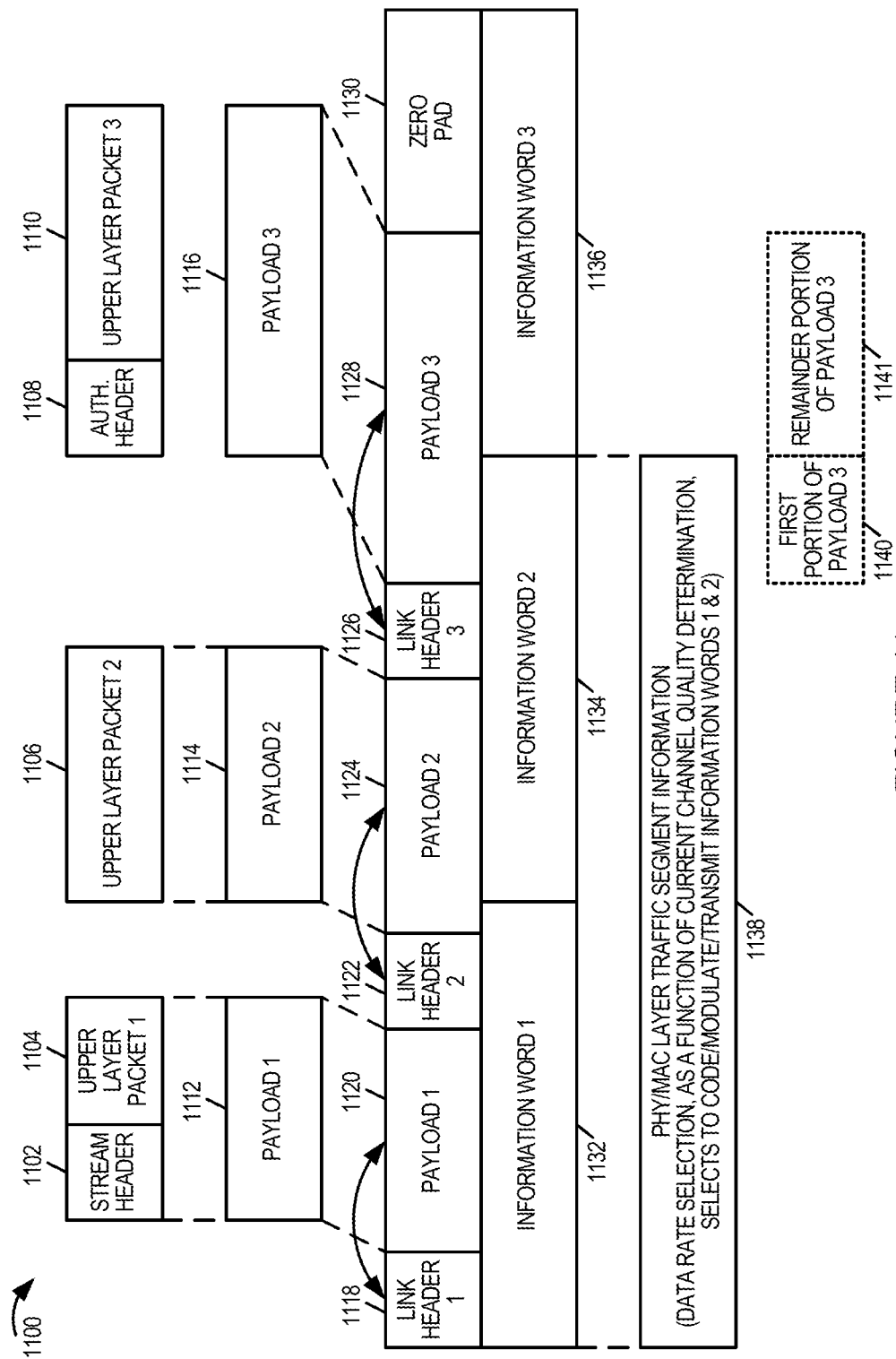
FIG. 11 is a drawing illustrating packets, packet fragmentation and communication for a first exemplary traffic segment in accordance with an exemplary embodiment.

FIG. 11 is a drawing 1100 illustrating packets, packet fragmentation and communication for a first exemplary traffic segment in accordance with an exemplary embodiment. For the purposes of the example, assume that a first wireless communications device has three upper level packets (upper level packet 1 1104, upper level packet 2 1106, upper level packet 3 1110) that it would like to communicate to a second wireless communications device. Upper layer packet 1 1104 has an associated stream header 1102, while upper layer packet 3 1110 has an associated authentication header 1108. The combination of stream header 1102 and upper layer packet 1 1104 represents payload 1 1112. Upper layer packet 2 1106 is payload 2 1114. The combination of authentication header 1108 and upper layer packet 3 1110 represents payload 3 1116.

In accordance with a feature of some embodiments, the first communications device prepares a predetermined number of information words to be available for communication in a segment. The predetermined number is, e.g., a maximum number of information words that can possibly be conveyed in the communications segment assuming best case channel conditions, e.g., a highest data rate is selected for the segment. In this example, the predetermined number of information words is three. In other embodiments, the predetermined number is a different value, e.g., 14.

At the time of preparation the first communications device may not, and sometimes does not, know the actual number of information words that it will be allowed to transmit in the communications segment. For example, the actual number of information words to be communicated is determined at a time just prior to transmission based on current channel conditions at that time, e.g., as part of a rate option determination for the segment.

Generation of the exemplary three information words (information word 1 1132, information word 2 1134, information word 3 1136) will now be described. Corresponding to each payload or payload portion to be included in the information words, the first communications device generates a link header. The link headers are, e.g., link header in accordance with the exemplary format of Table 1. Link header 1 1118 is generated to correspond to payload 1 1120; link header 2 1122 is generated to correspond to payload 2 1124, and link header 3 1126 is generated to correspond to payload 3 1128. Payload 1 1120 is payload 1 1112; payload 2 1124 is payload 2 1114; payload 3 1128 is payload 3 1116. The set of information words (1132, 1134, 1136) includes link header 1 1118 followed by payload 1 1120, followed by link header 2 1122, followed by payload 2 1124, followed by link header 3 1126, followed by payload 3 1128, followed by a zero pad 1130.

It should be observed information word boundaries need not, and in this case do not, correspond to payload boundaries. In this example, for this exemplary segment, a data rate selection, performed as a function of a current channel quality determination, has selected a rate option which results in information words 1 and 2 being selected to be encoded, modulated and transmitted in this traffic segment via the PHY/MAC layer as indicated by block 1138. Thus, in such a situation link header 1 1118, payload 1 1120, link header 2 1122, payload 2 1124, link header 3 1126 and a first portion 1140 of payload 3 1128 will be communicated in the communications segment. In such a situation there is a remainder portion 1141 of payload 3 1128 which has not been transmitted in this segment. The link header 3 1126 was generated based on the entire payload 3 1128.

In the example of FIG. 11, generated link header 3 1126 indicates that the payload 3 1128 is entirely included in the present segment. Subsequently the actual rate option for the segment is determined, and in this example, based on the determined rate option, information words 1 1132 and information words 2 1134 are sent but information word 3 1136 is not sent. Link header 3 1126 was not modified to reflect that a portion of payload 3 was not transmitted in the segment. In some such embodiments, the link header 3 1126 includes a length field and the length field indicates a length, e.g., a payload 3 length, that is greater than or equal to the actual length of the corresponding transmitted payload information for the segment. Thus, in some embodiments, there is separation between two Layers, e.g., separation between Layer 2 and Layer 1. For instance, the link header which is generated and transmitted, e.g., link header 3 1126, is not based on the actual rate option which is used in the segment and is not modified prior to transmission to reflect the actual rate option which was selected and used for the segment.

In some embodiments, Layer 2 passes the maximum number of information words (uncoded) to Layer 1. Layer 1 can encode each of those information words. In one embodiment of encoding, each of those information words are used to generate one single codeword. In another embodiment, each information word is used to generate a separate codeword. Then, when the actual rate option is determined for the segment, Layer 1 generates one or multiple codewords from the pre-prepared codeword(s). Thus, in some embodiments, two-step coding is used.

In some embodiments, there is separation between a second and first layer, e.g., Layer 2/Layer 1, with regard to a second layer header; however no encoding in the first layer occurs until the rate option for the segment is determined. For instance, there is no modification of a generated link layer header based on a subsequently decided actual rate option used for the segment; however, Layer 1 does no encoding until the actual rate option to be used for the segment is determined.

Figure 12:
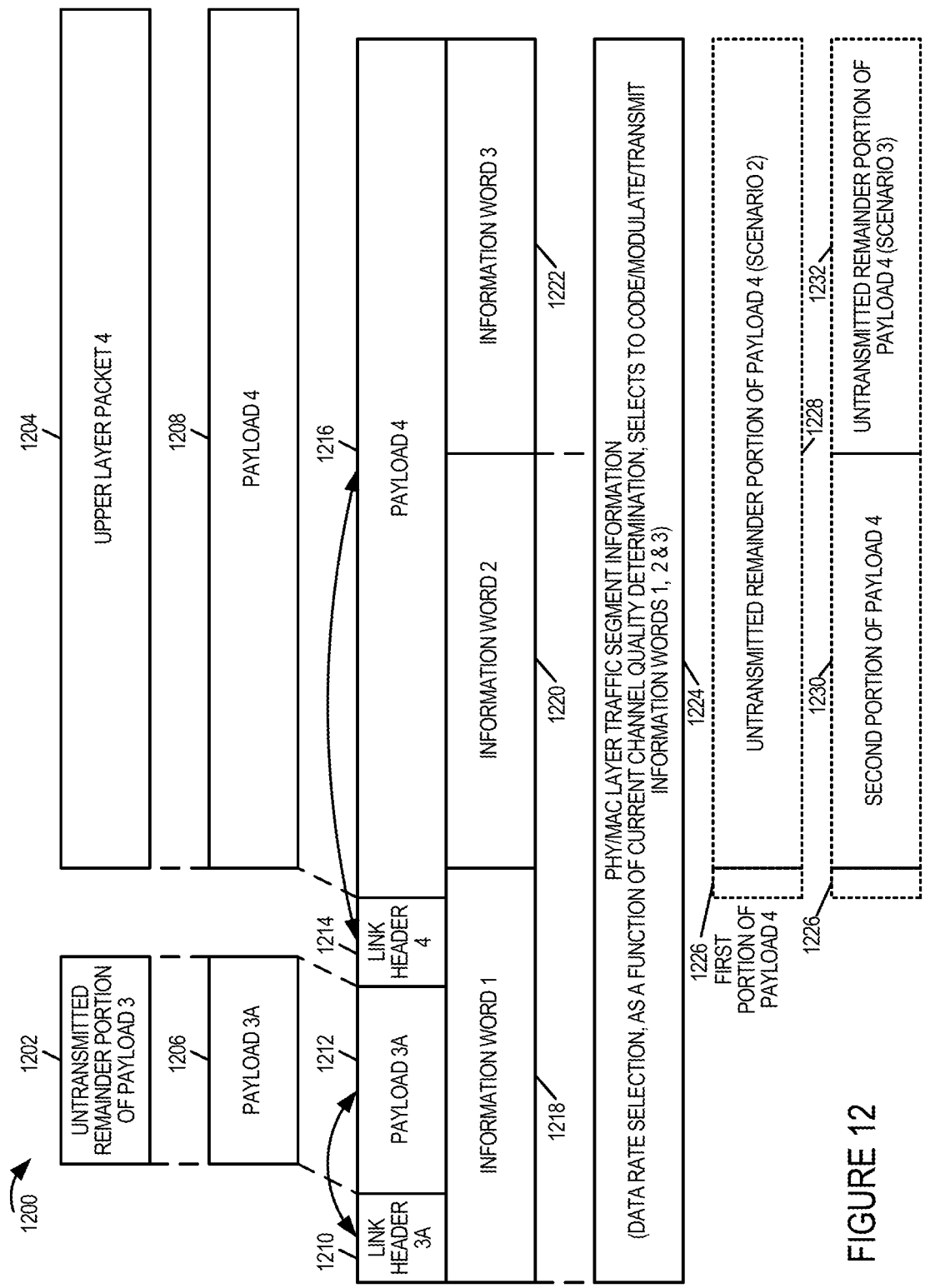
FIG. 12 is a drawing illustrating packets, packet fragmentation and communication for a second exemplary traffic segment in accordance with an exemplary embodiment.

FIG. 12 is a drawing 1200 illustrating packets, packet fragmentation and communication for a second exemplary traffic segment in accordance with an exemplary embodiment. Consider that FIG. 12 is a continuation of the example presented in FIG. 11. For the purposes of the example, assume that the first wireless communications device now has an untransmitted remainder portion of payload 3 1202 and upper layer packet 4 1204 waiting to be transmitted. Untransmitted remainder portion of payload 3 1202 of FIG. 12 is, e.g., remainder portion of payload 3 1141 of FIG. 11.

Untransmitted remainder portion of payload 3 1202 is payload 3A 1206. Upper layer packet 4 1204 is payload 4 1208.

The first communications device again prepares three information words to be available for communication in a segment. Generation of the exemplary three information words (information word 1 1218, information word 2 1220, information word 3 1222) will now be described. Corresponding to each payload or payload portion to be included in the information words, the first communications device generates a link header. The link headers are, e.g., link header in accordance with the exemplary format of Table 1. Link header 3A 1210 is generated to correspond to payload 3A 1212; link header 4 1214 is generated to correspond to payload 4 1216. Payload 3A 1212 is payload 3A 1206; payload 4 1216 is payload 4 1208. The set of information words (1218, 1220, 1222) includes link header 3A 1210 followed by payload 3A 1212, followed by link header 4 1214, followed by payload 4 1216.

It should be observed information word boundaries need not, and in this case do not, always correspond to payload boundaries. In this example, for this exemplary segment, a data rate selection, performed as a function of a current channel quality determination, has selected the highest rate option which results in information words 1, 2 and 3 being selected to be encoded, modulated and transmitted in this traffic segment via the PHY/MAC layer as indicated by block 1224. Thus, in such a situation link header 3A 1210, payload 3A 1212, link header 4 1214, and payload 4 1216 will be communicated in this communications segment.

However, if the rate selection was such that information word 1 1218 was to be communicated but not information words 2 and 3, then link header 3A 1210 payload 3A 1212, link header 4 1214 and a first portion 1226 of payload 4 1216 would have been communicated. In such a situation at least one more communications segment would be needed to communicate the untransmitted remainder portion 1228 of payload 4 1216.

Consider another possibly, if the rate selection was such that information words 1 and 2 but not information word 3 were to be communicated, then link header 3A 1210 payload 3A, link header 4 1214, a first portion 1226 of payload 4 1216 and a second portion 1230 of payload 4 1216 would have been communicated. In such a situation at least one more communications segment would be needed to communicate the untransmitted remainder portion 1232 of payload 4 1216. Note in this scenario the untransmitted remainder portion 1232 of payload 4 1216 would be smaller than the untransmitted remainder portion 1228 of payload 1216 in the previously presented scenario.

Note that in each of the three alternative scenarios presented, the same link header 4 1214 is communicated, even though different amounts of the payload 4 1216 (full payload 4 1216, small fragment 1226 of payload 4, larger fragment (1226+1230) of payload 4) are communicated.

Consider link header 3 1126 of FIG. 11 and link header 3A 1210 of FIG. 12. Also consider that the link header format of Table 1 is used. In one such exemplary embodiment, for link header 3: version=1; length=100 (length of payload 3); next header=1 which indicates auth. type header; link ID=2; packet Id/Sequence Nr.=7; More Fragment Flag=0; Offset=0. Continuing with the example, for link header 3A: version=1, length=60 (length of payload 3A); next header=0 which indicates portion of upper layer packet follows link header 3A; packet Id/Sequence Nr.=7, More Fragment Flag=0; Offset=40.

It may be observed that the length field value in a header does not always match the amount of data actually transmitted in the segment. For example, the length field for link header 3 1126 indicates the full length of payload 3 1128, but in the example of FIG. 11 only a first portion of payload 3 was actually communicated which truncated at the boundary between information word 2 1134 and information word 3 1136. It may also be observed that the More Fragment Field does not always match the actual transmission. For example, the More Fragment Field in link header 3 1126 in the example of FIG. 11 was set to 0 indicating no more fragments; however, due to the data rate selected as indicated by block 1138, another fragment of payload 3, namely payload 3A, needed to be transmitted in a subsequent transmission segment.

The intended receiver device is aware of the approach being used, and is able to properly reconstruct packets using the link header information in combination with information identifying the data rate used for a particular transmission segment.

In some embodiments, some packets are link layer packets. In some embodiments, some packets are mac frames which are also sometimes called mac layer packets.

The techniques of various embodiments may be implemented using software, hardware and/or a combination of software and hardware. Various embodiments are directed to apparatus, e.g., relay stations, mobile nodes such as mobile access terminals, base stations including one or more attachment points, and/or communications systems. Various embodiments are also directed to methods, e.g., method of controlling and/or operating relay stations, mobile nodes, base stations and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented. In various embodiments nodes described herein are implemented using one or more modules to perform the steps corresponding to one or more methods, for example, generating a first sequence of M bits communicating a first packet header and a packet payload corresponding to said first packet header, said first packet header indicating a full length of said packet payload; transmitting N of said M bits, said N bits including a portion of said packet payload; when the portion of said packet payload is less than the indicated full length of said packet payload, forming a second sequence of X bits communicating a second packet header and part of a remainder portion of said packet payload, said second packet header indicating a length less than the indicated full length of said packet payload, X, M and N being positive integers, receiving in a first transmission segment a first packet header and a corresponding first packet payload portion, said first packet header indicating a first packet payload length; determining if a length of the first packet payload portion is less than the indicated first packet payload length; when it is determined that the length of the first packet payload portion is less than the indicated first packet payload length, storing the received first packet payload portion; and combining the stored first packet payload portion with a second packet payload portion received in a second communication segment, etc. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s). Some embodiments are directed to a device, e.g., communications device, including a processor configured to implement one, multiple or all of the steps of one or more methods of the invention.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

In some embodiments, the processor or processors, e.g., CPUs, of one or more devices, e.g., communications devices such as wireless terminals, base stations, and/or relay stations are configured to perform the steps of the methods described as being performed by the communications device. Accordingly, some but not all embodiments are directed to a device, e.g., communications device, with a processor which includes a module corresponding to each of the steps of the various described methods performed by the device in which the processor is included. In some but not all embodiments a device, e.g., communications device, includes a module corresponding to each of the steps of the various described methods performed by the device in which the processor is included. The modules may be implemented using software and/or hardware.

While described in the context of an OFDM system, at least some of the methods and apparatus of various embodiments are applicable to a wide range of communications systems including many non-OFDM and/or non-cellular systems. At least some of the methods and apparatus are applicable to hybrid systems, e.g. a system including OFDM and CDMA signaling techniques.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between access nodes and mobile nodes, between access nodes and relay station, and/or between relay stations and mobile nodes. In some embodiments the access nodes are implemented as base stations which establish communications links with mobile nodes and/or relay stations using OFDM and/or CDMA. In various embodiments the mobile nodes are implemented as notebook computers, personal data assistants (PDAs), or other portable devices including receiver/transmitter circuits and logic and/or routines, for implementing the methods.

What is claimed is:

1. A communications method, the method comprising:
generating a first sequence of M bits communicating a first packet header and a packet payload corresponding to said first packet header, said first packet header indicating a full length of said packet payload;
determining, after generation of a portion of said sequence of M bits communicating the first packet header, a rate option and a number N of bits to be transmitted in a first transmission segment based on a channel quality;
transmitting N of said M bits and a rate indicator, said N bits communicating said first packet header and including a portion of said packet payload; and
when the portion of said packet payload is less than the indicated full length of said packet payload, forming a second sequence of X bits communicating a second packet header and at least some of a remainder portion of said packet payload, said second packet header indicating a length of the remainder portion of said packet payload, said remainder portion being an untransmitted portion of said packet payload, X, M and N being positive integers.

2. The communications method of claim 1, further comprising:
truncating said M bits to N bits prior to transmitting said N bits.

3. The communications method of claim 2, wherein said N bits are transmitted in encoded and modulated form.

4. The communications method of claim 1,
wherein said first packet header indicates that said packet payload is not fragmented; and
wherein N is determined to be less than M, the method further comprising:
transmitting bits in a second transmission segment communicating a second packet header and a second packet payload portion, said second packet payload portion including at least some of said remainder portion of said packet payload.

5. The communications method of claim 1, wherein said first sequence of M bits includes a plurality of packet headers and a plurality of packet payloads, said first packet header and said packet payload being part of said first sequence.

6. A communications device comprising:
at least one processor configured to:
generate a first sequence of M bits communicating a first packet header and a packet payload corresponding to said first packet header, said first packet header indicating a full length of said packet payload;
determine, after generation of a portion of said sequence of M bits communicating the first packet header, a rate option and a number N of bits to be transmitted in a first transmission segment based on a channel quality;
transmit N of said M bits and a rate indictor, said N bits communicating said first packet header and including a portion of said packet payload; and
form a second sequence of X bits communicating a second packet header and at least some of a remainder portion of said packet payload when the portion of said packet payload is less than the indicated full length of said packet payload, said second packet header indicating a length of the remainder portion of said packet payload, said remainder portion being an untransmitted portion of said packet payload, X, M and N being positive integers;
and memory coupled to said at least one processor.

7. The communications device of claim 6, wherein said at least one processor is further configured to:
truncate said M bits to N bits prior to transmitting said N bits.

8. The communications device of claim 7, wherein said N bits are transmitted in encoded and modulated form.

9. The communications device of claim 6,
wherein said first packet header indicates that said packet payload is not fragmented; and
wherein N is determined to be less than M, said at least one processor being further configured to:
transmit bits in a second transmission segment communicating a second packet header and a second packet payload portion, said second packet payload portion including at least some of said remainder portion of said packet payload.

10. A communications device comprising:
means for generating a first sequence of M bits communicating a first packet header and a packet payload corresponding to said first packet header, said first packet header indicating a full length of said packet payload;
means for determining, after generation of a portion of said sequence of M bits communicating the first packet header, a rate option and a number N of bits to be transmitted in a first transmission segment based on a channel quality;
means for transmitting N of said M bits and a rate indicator, said N bits communicating said first packet header and including a portion of said packet payload; and
means for forming a second sequence of X bits communicating a second packet header and at least some of a remainder portion of said packet payload when the portion of said packet payload is less than the indicated full length of said packet payload, said second packet header indicating a length of the remainder portion of said packet payload, said remainder portion being an untransmitted portion of said packet payload, X, M and N being positive integers.

11. The communications device of claim 10, further comprising:
means for truncating said M bits to N bits prior to transmitting said N bits.

12. The communications device of claim 11, wherein said N bits are transmitted in encoded and modulated form.

13. The communications device of claim 10,
wherein said first packet header indicates that said packet payload is not fragmented; and
wherein N is determined to be less than M, and
wherein said means for transmitting is controlled to transmit bits in a second transmission segment communicating a second packet header and a second packet payload portion, said second packet payload portion including at least some of said remainder portion of said packet payload.

14. The communications device of claim 10, wherein said first sequence of M bits includes a plurality of packet headers and a plurality of packet payloads, said first packet header and said packet payload being part of said first sequence.

15. A computer program product for use in a communications device, the computer program product comprising:
a non-transitory computer readable medium comprising:
code for causing at least one computer to generate a first sequence of M bits communicating a first packet header and a packet payload corresponding to said first packet header, said first packet header indicating a full length of said packet payload;
code for causing at least one computer to determine, after generation of a portion of said sequence of M bits communicating the first packet header, a rate option and a number N of bits to be transmitted in a first transmission segment based on a channel quality;
code for causing said at least one computer to transmit N of said M bits and a rate indicator, said N bits communicating said first packet header and including a portion of said packet payload; and
code for causing said at least one computer to forming a second sequence of X bits communicating a second packet header and at least some of a remainder portion of said packet payload when the portion of said packet payload is less than the indicated full length of said packet payload, said second packet header indicating a length of the remainder portion of said packet payload, said remainder portion being an untransmitted portion of said packet payload, X, M and N being positive integers.

16. A communications method, the method comprising:
receiving in a first transmission segment a first packet header and a corresponding first packet payload portion, said first packet header identifying a first packet and indicating a first packet payload length;

determining if a length of the first packet payload portion is less than the indicated first packet payload length;

determining a number of information bits communicated in said first transmission segment from a rate indicator communicated in said first transmission segment;

when it is determined that the length of the first packet payload portion is less than the indicated first packet payload length, storing the received first packet payload portion;

receiving in a second transmission segment a second packet header and a second packet payload portion, said second packet header identifying the first packet identified by said first packet header; and combining the stored first packet payload portion with the second packet payload portion received in the second transmission segment.

17. The communications method of claim 16, wherein determining if a length of the first packet payload portion is less than the indicated first packet payload length includes:

determining the number of bits recovered from said first transmission segment which do not correspond to said first packet payload portion;

determining the number of bits corresponding to said first packet payload portion based on the difference between said number of information bits and the determined number of bits recovered from said first transmission segment which do not correspond to said first packet payload portion; and comparing the determined number of bits corresponding to said first packet payload portion to the indicated first packet payload length.

18. The communications method of claim 16, wherein said first packet header indicates that said first packet is not fragmented; and wherein said second packet header indicates the length of the second packet payload portion.

19. A communications device comprising:

at least one processor configured to:

receive in a first transmission segment a first packet header and a corresponding first packet payload portion, said first packet header identifying a first packet and indicating a first packet payload length;

determine if a length of the first packet payload portion is less than the indicated first packet payload length;

determine a number of information bits communicated in said first transmission segment from a rate indicator communicated in said first transmission segment;

store the received first packet payload portion when it is determined that the length of the first packet payload portion is less than the indicated first packet payload length;

receive in a second transmission segment a second packet header and a second packet payload portion, said second packet header identifying the first packet identified by said first packet header; and combine the stored first packet payload portion with the second packet payload portion received in the second transmission segment;

and memory coupled to said at least one processor.

20. The communications device of claim 19, wherein said at least one processor is configured to:

determine the number of bits recovered from said first transmission segment which do not correspond to said first packet payload portion;

determine the number of bits corresponding to said first packet payload portion based on the difference between said number of information bits and the determined number of bits recovered from said first transmission segment which do not correspond to said first packet payload portion; and compare the determined number of bits corresponding to said first packet payload portion to the indicated first packet payload length, as part of being configured to determine if a length of the first packet payload portion is less than the indicated first packet payload length.

21. The communications device of claim 20, wherein said first packet header indicates that said first packet is not fragmented; and wherein said second packet header indicates the length of the second packet payload portion.

22. A communications device comprising:

means for receiving in a first transmission segment a first packet header and a corresponding first packet payload portion, said first packet header identifying a first packet and indicating a first packet payload length;

means for determining if a length of the first packet payload portion is less than the indicated first packet payload length;

means for determining a number of information bits communicated in said first transmission segment from a rate indicator communicated in said first transmission segment;

means for storing the received first packet payload portion when it is determined that the length of the first packet payload portion is less than the indicated first packet payload length;

means for receiving in a second transmission segment a second packet header and a second packet payload portion, said second packet header identifying the first packet identified by said first packet header; and means for combining the stored first packet payload portion with the second packet payload portion received in the second transmission segment.

23. The communications device of claim 22, wherein said means for determining if a length of the first packet payload portion is less than the indicated first packet payload length includes:

means for determining the number of bits recovered from said first transmission segment which do not correspond to said first packet payload portion;

means for determining the number of bits corresponding to said first packet payload portion based on the difference between said number of information bits and the determined number of bits recovered from said first transmission segment which do not correspond to said first packet payload portion; and means for comparing the determined number of bits corresponding to said first packet payload portion to the indicated first packet payload length.

24. The communications device of claim 23, wherein said first packet header indicates that said first packet is not fragmented; and wherein the second packet header indicates the length of the second packet payload portion.

25. A computer program product for use in a communications device, the computer program product comprising:

a non-transitory computer readable medium comprising:

code for causing at least one computer to receive in a first transmission segment a first packet header and a corresponding first packet payload portion, said first packet header identifying a first packet and indicating a first packet payload length;

code for causing said at least one computer to determine if a length of the first packet payload portion is less than the indicated first packet payload length;

code for causing said at least one computer to determine a number of information bits communicated in said first transmission segment from a rate indicator communicated in said first transmission segment;

code for causing said at least one computer to store the received first packet payload portion when it is determined that the length of the first packet payload portion is less than the indicated first packet payload length;

code for causing said at least one computer to receive in a second transmission segment a second packet header and a second packet payload portion, said second packet header identifying the first packet identified by said first packet header; and code for causing said at least one computer to combine the stored first packet payload portion with the second packet payload portion received in the second transmission segment.

* * * * *